(12) United States Patent
Takasugi

(10) Patent No.: US 7,324,292 B2
(45) Date of Patent: Jan. 29, 2008

(54) ILLUMINATION OPTICAL SYSTEM, ILLUMINATION APPARATUS USING THE ILLUMINATION OPTICAL SYSTEM, AND OBSERVATION SYSTEM PROVIDED WITH THE ILLUMINATION OPTICAL SYSTEM OR THE ILLUMINATION APPARATUS

(75) Inventor: Yoshiharu Takasugi, Iruma (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/181,816

(22) Filed: Jul. 15, 2005

(65) Prior Publication Data

US 2006/0018031 A1 Jan. 26, 2006

(30) Foreign Application Priority Data

Jul. 23, 2004 (JP) .............................. 2004-216035

(51) Int. Cl.
*G02B 13/20* (2006.01)

(52) U.S. Cl. ...................... 359/707; 362/558
(58) Field of Classification Search ................ 359/707; 362/558

See application file for complete search history.

(56) References Cited

U.S. PATENT DOCUMENTS

| 4,728,994 A | * | 3/1988 | Spinelli et al. ................ 355/71 |
| 5,961,197 A | * | 10/1999 | Watai et al. ................. 362/628 |
| 6,963,451 B2 | * | 11/2005 | Se et al. ...................... 359/599 |
| 2002/0007111 A1 | * | 1/2002 | Deckert et al. ............. 600/177 |
| 2004/0076396 A1 | * | 4/2004 | Suga ........................... 385/146 |

FOREIGN PATENT DOCUMENTS

| JP | 06-148519 | 5/1994 |
| JP | 2000-193894 | 7/2000 |
| JP | 2001-292956 | 10/2001 |

* cited by examiner

*Primary Examiner*—Jordan M. Schwartz
(74) *Attorney, Agent, or Firm*—Kenyon & Kenyon LLP

(57) ABSTRACT

An illumination optical system disposed in order to diffuse illumination light emitted from a light source, includes at least one optical device having a roughened optical surface, with the arithmetic average roughness of the roughened surface set in a range of 0.05 to 0.75 [μm].

23 Claims, 18 Drawing Sheets

ILLUMINATION OPTICAL SYSTEM, ILLUMINATION APPARATUS USING THE ILLUMINATION OPTICAL SYSTEM, AND OBSERVATION SYSTEM PROVIDED WITH THE ILLUMINATION OPTICAL SYSTEM OR THE ILLUMINATION APPARATUS

CROSS REFERENCE TO RELATED APPLICATION

This application claims benefit under 35 U.S.C. §119 of Japanese Patent Application No. 2004-216,035, filed in Japan on Jul. 23, 2004, the contents of which are incorporated by reference.

BACKGROUND OF THE INVENTION

1. Field of the Invention

The present invention relates to an illumination optical system, an illumination apparatus using this system, and an observation system using the illumination apparatus.

2. Description of the Related Art

As an illumination optical system for illuminating a broad area of an object, there is a system in which a light emitting device such as a lamp or an LED, or an end surface of a light guide fiber bundle that transmits light is used as a light source, and light emitted from the light source is diverged by a negative lens or a positive lens.

In the illumination optical system constructed using a negative lens, to secure a broad area on which illumination light is distributed with the negative lens, a loss is generated in the quantity of light, unless the outer diameter of the negative lens is increased. Therefore, for example, in an illumination optical system using a negative lens, it is difficult to broaden the light distribution area to such an extent that the light distribution angle exceeds 120°. When the light distribution area is broadened, the radius of curvature of the concave surface of the negative lens is reduced, and it becomes difficult to work the lens.

In an illumination optical system constructed using a positive lens, even when the outer diameter of the positive lens is small, the light distribution area can be broadened. However, to distribute the illumination light more broadly, the light refracting action of the positive lens has to be strengthened. Therefore, the radius of curvature of the positive lens decreases, and workability of the positive lens drops. It is difficult to realize an illumination optical system having light distribution characteristics such that the light distribution exceeds 150° when using a positive lens.

Moreover, when a light guide fiber bundle is used as a light source of the illumination optical system, there is a problem that light distribution unevenness is generated. This will be described with reference to FIGS. 32A, 32B and 32C.

A light guide fiber bundle 1 is formed by bundling a plurality of optical fibers. Each fiber is made up of a core and a cladding layer that surrounds the core; only the core part transmits the light. The cores of the fibers are arranged in a dot matrix form in an emission end surface of the light guide fiber bundle as shown in FIG. 32A. When an illumination optical system formed by a positive lens is used, as shown in FIG. 32B, the emission end surface of the light guide fiber bundle 1 is enlarged and projected on the object surface 4. Therefore, on the surface of the object, a portion corresponding to the core of the end surface of the light guide fiber bundle becomes brighter than other portions. As shown in FIG. 32C, the light distribution unevenness is generated in dot matrix form on the object surface 4.

Furthermore, since the light is separated into colors by dispersion of the glass material of the lens included in the illumination optical system, there is a problem that color unevenness is generated in the peripheral portion of the illuminated area. The color unevenness is generated in the case where the illumination optical system is composed of a positive lens. The unevenness will be described with reference to FIG. 33A. The glass material of the lens has dispersion properties (the refractive index varies dependent on the wavelength of light). Therefore, a light ray that exits from the end surface of the light guide fiber bundle, travels in parallel with the optical axis of the positive lens, and enters the positive lens, is given an angle of refraction which varies dependent on the wavelength of the light ray that is incident on the surface of the positive lens. As a result, the light ray that exits from the positive lens is separated into colors. Therefore, a color unevenness is generated. For example, the outside of an illuminated area becomes slightly bluish. Moreover, when the radius of curvature of the refractive surface of the positive lens is reduced, and the refractive power of the positive lens is strengthened in order to distribute the illumination light broadly, this unevenness becomes quite noticeable.

Laid-Open Japanese Patent Application No. 6-148519 discloses an illumination optical system for reducing generation of the above-described light distribution unevenness or color unevenness.

The Laid-Open Japanese Patent Application No. 6-148519 shows an illumination optical system used on the emission side of the light guide fiber bundle. The illumination optical system is formed of only a positive lens, or formed of a positive lens and a single fiber, the single fiber being disposed on the emission end surface of the light guide fiber bundle. The positive lens is a plano-convex lens whose convex surface is an aspherical surface.

In the illumination optical system of the Laid-Open Japanese Patent Application No. 6-148519, the convex surface of the positive lens is formed into an aspherical shape, and the light distribution area is broadened in such a manner that the color unevenness is generated outside the observation area, so that observation is not obstructed.

Further, in the Laid-Open Japanese Patent Application No. 6-148519, it is proposed that the lens surface of the illumination optical system be roughened in order to reduce illumination unevenness. That is, in the illumination optical system in which the convex surface of the positive lens is formed into a polished surface, as shown in FIG. 33A, a color unevenness is generated in the illumination light. However, when the convex surface of the positive lens is formed as a roughened surface as shown in FIG. 33B, the ray that enters the roughened surface is diffused in a random direction regardless of the wavelength, no color unevenness is generated, and the illuminated area can be set to uniform brightness. Moreover, the illuminated area is broadened by the random diffusion of light by the roughened surface, and wide angle illumination is achieved.

The Laid-Open Japanese Patent Application No. 2000-193894 describes a lens surface formed into a light diffusing surface, that is, a roughened surface formed by grinding. The ground lens surface is chemically treated with hydrogen fluoride. Accordingly, the loss of the quantity of light caused by the roughened surface is suppressed to raise transmittance. Furthermore, time for the chemical treatment is controlled, so that the loss of the quantity of the illumination light is balanced with the light distribution unevenness._

In the illumination optical system disclosed in the Laid-Open Japanese Patent Application No. 2000-193894, the plano-convex lens that forms the illumination optical system has a roughened surface on its plane side whose degree of roughness is set in such a manner that the loss of the quantity of light is about 10% of that of the lens finished into a polished surface. The light distribution property of this plano-convex lens is the same as that of the lens finished into a polished surface, and the roughness level of the roughened surface is very close to that of the polished surface.

Moreover, in the Laid-Open Japanese Patent Application No. 2000-193894, an example of the working of the roughened surface of the lens, in which the surface is ground by an abrasive wheel having a mesh size of about #800 is give. However, during the working of the lens, the surface state of the abrasive wheel changes. For example, the surface of the grindstone is clogged with residue or polishing waste generated at a time when abrasive grains on the surface of the abrasive wheel are abraded. Furthermore, the surface state of the lens surface to be worked changes with working conditions such as the number of revolutions of the abrasive wheel or the lens to be worked, and time. Since the roughened state of the lens surface cannot be fully controlled by the mesh size of the abrasive wheel for the working, the roughened state of the lens surface required for securing desired optical properties has been unknown.

Laid-Open Japanese Patent Application No. 2001-292956 discloses a negative or positive lens on which a roughened lens surface is formed. However, it is simply described that a lens having a roughened surface is used, and the roughness of the abrasive wheel for the working is simply described in the same manner as in the conventional technique. But the roughened state of the lens surface is not described.

Furthermore, in the conventional illumination optical system, even in the case where the above-described dot-matrix light distribution unevenness is inconspicuous, radial light distribution unevenness is sometimes generated in a peripheral portion of the illumination field. When the illumination unevenness is insufficiently reduced, light distribution unevenness is generated as shown in FIG. 34. In the example of FIG. 34, a plane is illuminated with the illumination light, and the central portion of the illumination field is interrupted and blackened so that the peripheral portion of the illumination field is easily seen.

BRIEF SUMMARY OF THE INVENTION

According to one aspect of the present invention, there is provided an illumination optical system disposed in such a manner as to diffuse illumination light emitted from a light source, wherein at least one surface of an optical element in the illumination optical system is formed as a roughened surface, and the arithmetic average roughness of the roughened surface is in a range of 0.05 to 0.75 [μm].

According to another aspect of the present invention, there is provided an illumination apparatus in which the illumination optical systems of the present invention is used.

According to still another aspect of the present invention, there is provided an observation system which comprises an illumination apparatus for illuminating an object with light emitted from a light source and an observation apparatus for visually observing an image of an object or for displaying the image on an external display apparatus and observing the image, wherein either of the illumination optical system and the illumination apparatus of the present invention is used.

Other features and advantages of the present invention will be apparent from the following description of the embodiments and the accompanying claims.

BRIEF DESCRIPTION OF THE DRAWINGS

FIG. 1A is a sectional view of the illumination optical system, and FIG. 1B is an explanatory view showing that an illumination light ray parallel to an optical axis is projected to the object via the illumination optical system.

FIG. 12A is a sectional view along an optical axis of the illumination optical system, and FIG. 12B is an explanatory view showing that illumination light ray parallel to the optical axis is projected via the illumination optical system.

FIG. 14A is a sectional view along the optical axis of the illumination optical system, and FIG. 14B is an explanatory view showing that the illumination light parallel to the optical axis is projected via the illumination optical system.

FIG. 15A is a sectional view along the optical axis of the illumination optical system, and FIG. 15B is an explanatory view showing that the illumination light ray parallel to the optical axis is projected via the illumination optical system.

FIG. 16A is a sectional view along the optical axis of the illumination optical system, and FIG. 16B is an explanatory view showing that the illumination light ray parallel to the optical axis is projected via the illumination optical system.

FIG. 17A is a sectional view along the optical axis of the illumination optical system, and FIG. 17B is an explanatory view showing that the illumination light ray parallel to the optical axis is projected via the illumination optical system.

FIG. 18A is a sectional view along the optical axis of the illumination optical system, and FIG. 18B is an explanatory view showing that the illumination light ray parallel to the optical axis is projected via the illumination optical system.

FIG. 19A is a sectional view along the optical axis of the illumination optical system, and FIG. 19B is an explanatory view showing that the illumination light ray parallel to the optical axis is projected via the illumination optical system.

FIG. 26A shows an example in which one LED device is used as the light source, and FIG. 26B shows an example in which two LED devices are used as the light source.

FIG. 27A is an explanatory view showing the method of measuring the shape of the lens surface when the optical axis is arranged in the vertical direction, and FIG. 27B is an explanatory view showing the method of measuring the shape of the lens surface in a case where the optical axis of the lens is tilted from the vertical direction.

FIG. 33A is an explanatory view showing the color unevenness generated by dispersion of the glass material of the lens in a case where the illumination optical system comprises a positive lens, and FIG. 33B is an explanatory view showing an effect of reducing the color unevenness by a roughened lens surface.

FIG. 35A shows a situation of light rays in an illumination optical system having a numerical aperture (NA) of 0.5, FIG. 35B shows the situation of light rays in an illumination optical system having an NA of 0.2, FIG. 35C shows a situation in the illumination optical system formed by analogously miniaturizing the illumination optical system of FIG. 35B by ½, and FIG. 35D is an explanatory view showing an interval Pc between cores of the light guide fiber bundle.

DETAILED DESCRIPTION

Embodiments of the present invention will be described hereinafter. Prior to the description, the light distribution unevenness, generated in the peripheral portion of an illuminated area, will be described with reference to FIGS. 35A to 35D. Here, the influence of a roughened surface of the illumination optical system is not considered.

Figure 35A:
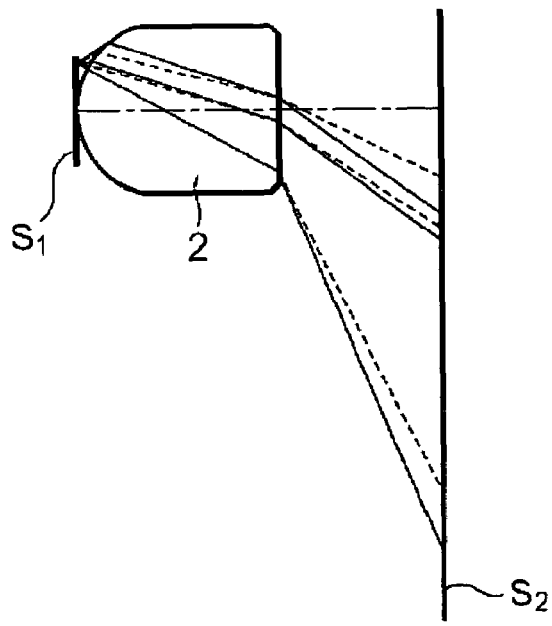
FIGS. 35A to 35D are explanatory views showing states of the illumination light emitted from an illumination optical system.
Figure 35B:
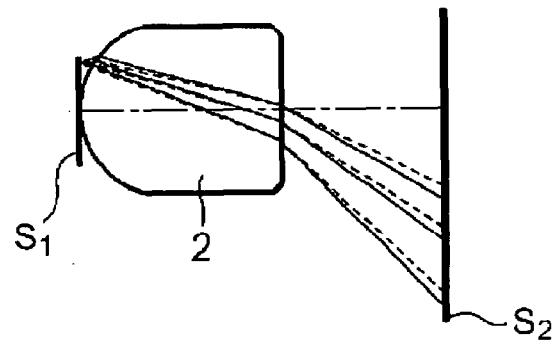
Figure 35C:
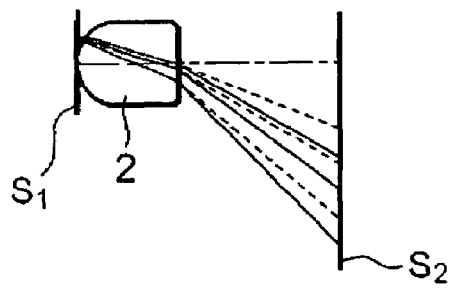

FIGS. 35A to 35C are explanatory views showing states of illumination light emitted from the illumination optical system. In FIG. 35A, an illumination optical system 2 has a numerical aperture (NA) of 0.5. The solid lines indicate light rays emitted from a position, whose height from the optical axis is 0.45 (height of ray of each of the rays is 0.45), of the end surface S of the light guide fiber bundle, and the broken lines indicate light rays whose height from the optical axis is 0.42. In FIG. 35B, the illumination optical system has an NA of 0.2. Solid lines show rays whose heights emitted from the light guide fiber bundle are 0.45, and broken lines show rays whose heights are 0.42. FIG. 35C shows an illumination optical system formed by analogously reducing and miniaturizing the illumination optical system 2 of FIG. 35B by ½. In FIG. 35C, solid lines show rays whose heights emitted from the light guide fiber bundle are 0.225, and broken lines show rays whose heights are 0.21.

Figure 35D:
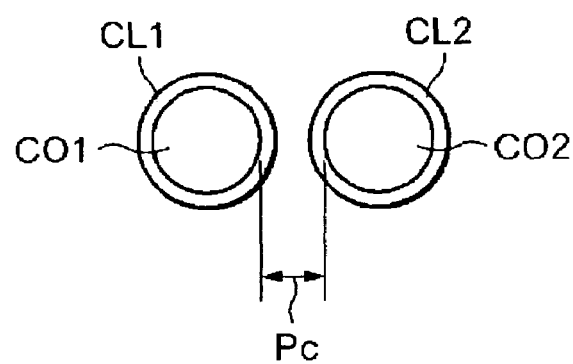

In FIGS. 35A and 35B, there is a difference of 0.03 between the height of the rays which exit from the light guide fiber bundle as shown by the solid and broken lines. The portion corresponding to the difference is assumed as a dark portion other than the cores. In the light guide fiber bundle, as shown in FIG. 35D, the interval between cores CO1 and CO2 corresponds to the dark portion, and the portion mainly comprises cladding layers CL1, CL2. This interval will be hereinafter denoted with Pc. When a plurality of light sources such as LEDs are used, the interval between the light emission parts of the light sources is designated Pc.

When this interval Pc becomes large enough, dark portions, which do not pass any light, increase in the end surface of the light guide fiber bundle, and light distribution unevenness is easily noticeable.

When the NA of the illumination optical system 2 is large as shown in FIG. 35A, the area illuminated with the light broadens on a surface S2 as compared with a case where the NA of the illumination optical system 2 is small as shown in FIG. 35B.

In the illumination optical system 2 shown in FIGS. 35A to 35C, it is considered that the dark portions other than the cores are projected between the areas shown by the solid and broken lines. In either of the illumination optical systems 2 shown in FIGS. 35A and 35B, bright and dark portions are superimposed on each other in a considerably broad area. Therefore, it is difficult to distinguish the bright portion from the dark portion on the surface S2. That is, when the NA is large, the light distribution unevenness is more inconspicuous.

On the other hand, when the illumination optical system 2 of FIG. 35B is miniaturized by ½ to reduce the focal length as shown in FIG. 35C, the areas shown by the solid and broken lines on the surface S2 shift a greater amount from each other. Therefore, bright portions and dark portions on the surface S2 are more clearly distinguished from each other. That is, when the focal length of the illumination optical system is small, its magnifying power increases when an end surface S1 of the light guide fiber bundle is projected onto the surface S2 to be illuminated. Therefore, a distribution of the bright portions and dark portions on the end surface S1 is enlarged and becomes conspicuous on the surface S2. That is, light distribution unevenness is easily generated in a case where the height of an outgoing ray from the light guide fiber bundle is small, and the focal length of the illumination optical system is small. Specifically, when a light source having a small height of the outgoing ray is used, or when the height of the outgoing ray is reduced by changing the quantity of light of the light source in order to adjust the brightness, the light distribution unevenness is easily noticeable.

In order to reduce the conspicuousness of the above-described light distribution, a roughened surface is disposed in the illumination optical system, and roughness Ra of the surface is preferably set in such a manner as to satisfy the following condition:

$$1\times10^{-3} < Pc/Ra < 1\times10^{3},$$

where Pc denotes the interval between the cores of the light guide fiber bundle, and Ra denotes the roughness of the roughened surface of the illumination optical system. It is to be noted that when a plurality of light sources such as LEDs are used, the interval Pc corresponds to the interval between the light emission parts of the light sources.

Moreover, to reduce the conspicuousness of the above-described light distribution unevenness, the illumination optical system is preferably set in such a manner as to satisfy the following condition:

$$1\times10^{-4}\,[1/mm] < |1/f \times Pc/Ra| < 1\times10^{4}\,[1/mm],$$

where Pc denotes the interval between the cores of the light guide fiber bundle, Ra denotes the roughness of the roughened surface of the illumination optical system, and f denotes the focal length of the illumination optical system. It is to be noted that when a plurality of light sources such as LEDs are used, the interval Pc corresponds to the interval between the light emission parts of the light sources. The focal length of the lens having the roughened surface is a focal length of a virtual lens in which the shape of the refractive surface of the lens in the vicinity of the optical axis is approximated by a spherical surface.

Furthermore, to reduce the conspicuousness of the above-described light distribution unevenness, the illumination optical system is preferably set in such a manner as to satisfy the following condition:

$$1\times10^{-4}\,[1/mm] < |1/f \times Pc/Ra \times (1/NA)| < 1\times10^{5}\,[1/mm],$$

where Pc denotes the interval between the cores of the light guide fiber bundle, Ra denotes the roughness of the roughened surface of the illumination optical system, f denotes the focal length of the illumination optical system, and NA denotes the numerical aperture of the light guide fiber. It is to be noted that when a plurality of light sources such as LEDs are used, the interval Pc corresponds to the interval between the light emission parts of the light sources. The focal length of the lens having the roughened surface is a focal length of a virtual lens in which the shape of the refractive surface of the lens in the vicinity of the optical axis is approximated by a spherical surface. In a light source like the LED, a sinusoidal value of an emission angle of the outgoing ray from the light source is assumed to be NA.

Since an illumination optical system is not an image forming optical system, an image forming magnification cannot be defined. However, as described above, the generation of the light distribution unevenness on the surface to be illuminated is influenced by the degree of enlargement of the brightness and darkness distribution of the light source by the illumination optical system.

Figure 1A:
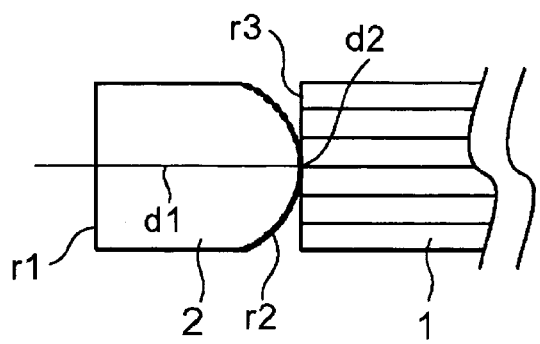
FIGS. 1A and 1B are diagrams showing Embodiment 1 of an illumination optical system according to the present invention.
Figure 1B:
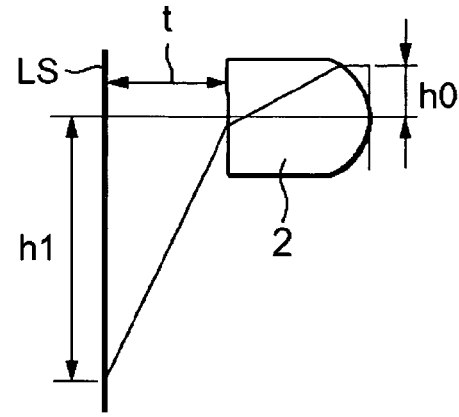

As shown in FIG. 1B, a maximum ray height of the outgoing ray from the light guide fiber bundle is assumed as h0. Moreover, the ray, which is emitted from a position having the height h0 of the emission end surface of the light guide fiber bundle and which travels in parallel to the optical axis, passes through the illumination optical system to illuminate an object surface LS, which is disposed a distance t from the emission end surface of the illumination optical system. At this time, the height of the ray on the illuminated surface is assumed as h1. The height h0 is substantially equal to the outer diameter of the light guide fiber bundle. When the ray height ratio of $\Delta h = h1/h0$ is large, the brightness and darkness distribution on the light source is enlarged and projected on the surface LS to be illuminated. Therefore, the radial light distribution unevenness is conspicuous. It is to be noted that the height of the ray indicates the distance from the optical axis of the illumination optical system 2.

In FIG. 1B, the illumination optical system is formed in such a manner that the ray height ratio $\Delta h$ is at least 1 or more in a case where the distance t from the emission end of the illumination optical system 2 to the illuminated surface is set to 1.5 mm. Then, the illuminated area can be broadened by the spread of the illumination light from the light source and by light ray diffusing effects of the roughened surface disposed in the illumination optical system.

To further broaden the illuminated area, the illumination optical system is preferably constructed in such a manner that the ray height ratio Δh is 2 or more. When the illumination optical system is constructed to have this ray height ratio, a light distribution unevenness is easily generated. However, when a roughened surface is provided, the light distribution unevenness can be reduced.

In this case, it is desirable to form a flat surface arranged at a portion near the object side (illuminated surface side) of the illumination optical system into a roughened surface. By doing so, the light distribution unevenness or color unevenness can be reduced by the light diffusing effects. The roughened surface is preferably disposed on the surface nearest to the object. However, the effects of the roughened surface are sometimes weakened by dirt or the like attached on the surface. Therefore, the roughened surfaces may be disposed not only on the surface nearest to the object but also on any of flat surfaces existing on a second surface and/or a third surface from the object side, if any.

Either of the light distribution unevenness and the color unevenness is conspicuous in the peripheral portion of the illuminated area. When the illumination optical system includes a lens surface having a refractive power, the light distribution unevenness and/or the color unevenness is largely influenced by the lens surface that largely bends the light ray, that is, the lens surface having a large refractive power. Therefore, when the surface having the large refractive power is formed into a roughened surface, the light distribution unevenness or the color unevenness can be effectively reduced.

Here, assuming that the refractive power of the surface to be roughened is ψ, the refractive index of a medium on the emission side of the surface is n', the refractive index of the medium on the incidence side is n, and the radius of curvature of the surface to be roughened is r, the refractive power of the surface to be roughened can be represented as follows:

$$\psi = (n' - n)/r.$$

Considering the strength of the refractive power, a surface which satisfies the following condition may be roughened:

$$|\psi| > 0.1.$$

Moreover, it is desirable that, among the plurality of optical surfaces that have refractive powers and are included in the illumination optical system, the surface positioned closest to the object to be illuminated is formed into a roughened surface. This is effective for reducing the light distribution unevenness or the color unevenness.

Furthermore, since the refractive power of the lens surface increases with the miniaturization of the illumination optical system, a surface which satisfies the following condition may be roughened in a small-sized illumination optical system:

$$|\psi| > 0.2.$$

Now, the roughness of the lens surface which defines the roughened surface will be described. The surface roughness of an optical surface in this application is defined by "JIS B 0601:2001 (ISO 4287:1997)", and the roughness is calculated assuming that a reference length lr (equal to a cutoff value λc) is 0.08 mm for obtaining a defined roughness curve. An arithmetic average roughness Ra and a root-mean-square roughness Rq defined in the standards are represented by the following equations:

$$Ra = \frac{1}{lr} \int_0^{lr} |Z(x)| dx$$

$$Rq = \sqrt{\frac{1}{lr} \int_0^{lr} Z^2(x) dx}$$

where Z(x) denotes a coordinate value indicating a height in a position x of the roughness curve. In this application, this arithmetic average roughness Ra is used as the definition of the roughness. A polished surface satisfies the inequality of Ra<0.005 [μm], whereas the roughened surface satisfies the inequality of Ra≧0.005 [μm].

The roughness of the roughened surface is evaluated using a roughness measuring apparatus. Measuring with the roughness measuring apparatus includes two methods: a method of directly measuring the roughness of the lens surface with a probe; and a method of indirectly measuring the roughness of the lens surface in a non-contact manner.

First, the method of directly measuring the roughness of the lens surface will be described.

Figure 27A:
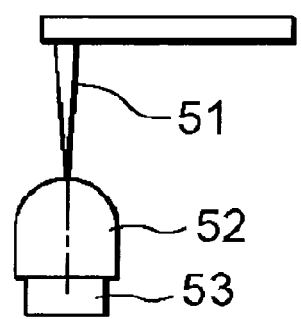
FIGS. 27A and 27B are explanatory views showing a method of measuring a shape of the lens surface by a probe contact type measuring apparatus.
Figure 27B:
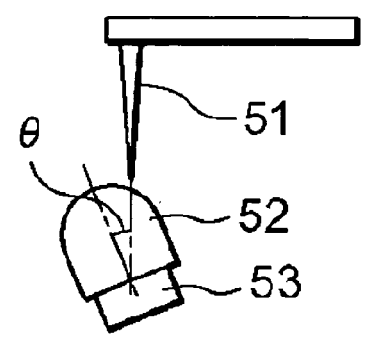

FIGS. 27A and 27B are explanatory views showing an outline of a method of bringing a probe into direct contact with the lens surface to measure the surface roughness. A lens 52 that is a measurement object is fixed to a lens holder 53 formed of a metal so that the lens is easily held or measured. When the roughness of the surface of the lens 52 is measured while directly tracing the shape of the lens surface with a probe 51, position data indicating the movement of the probe 51 is obtained. When the data is analyzed, surface shape data of the lens 52 can be obtained, and the roughness of the surface appears directly in the surface shape data.

As shown in FIG. 27A, in many cases, the roughness is measured while the lens 52 is disposed in such a manner that the optical axis of the lens is substantially parallel to the probe 51. However, it is sometimes difficult to bring the probe 51 into contact with the surface 52 depending on the shape of the lens surface. This will occur, for example, when the radius of curvature of the lens surface to be measured is small, or when the lens surface is formed into an aspherical shape and the probe 51 is not easily brought into contact with the lens surface in the peripheral portion thereof. In this case, as shown in FIG. 27B, the optical axis of the lens 52 is tilted with respect to the probe 51, and the shape of the peripheral portion of the lens surface is measured. In this case, the tilt angle θ may be set to, for example, 30°, 40° or the like in accordance with the surface shape of the lens 52.

In the shape measurement shown in FIGS. 27A and 27B, a sectional shape of a certain position of the lens surface is measured. Therefore, it is preferable to similarly measure a plurality of sectional shapes, each of which includes the optical axis of the lens to be inspected. The number of measurements to be performed is preferably large, but much time is required in the measurements. Therefore, in actual cases, the sectional shapes may be measured every 45° or 30° in terms of azimuth angle. When the surface shape is stably worked, it is possible to judge the working precision of the whole lens surface by measurement only in one direction or in two directions every 90° in terms of azimuth angle. In FIGS. 27A and 27B, the measuring of a positive lens is shown, but the shape of a negative lens may be measured using the same method.

Figure 28:
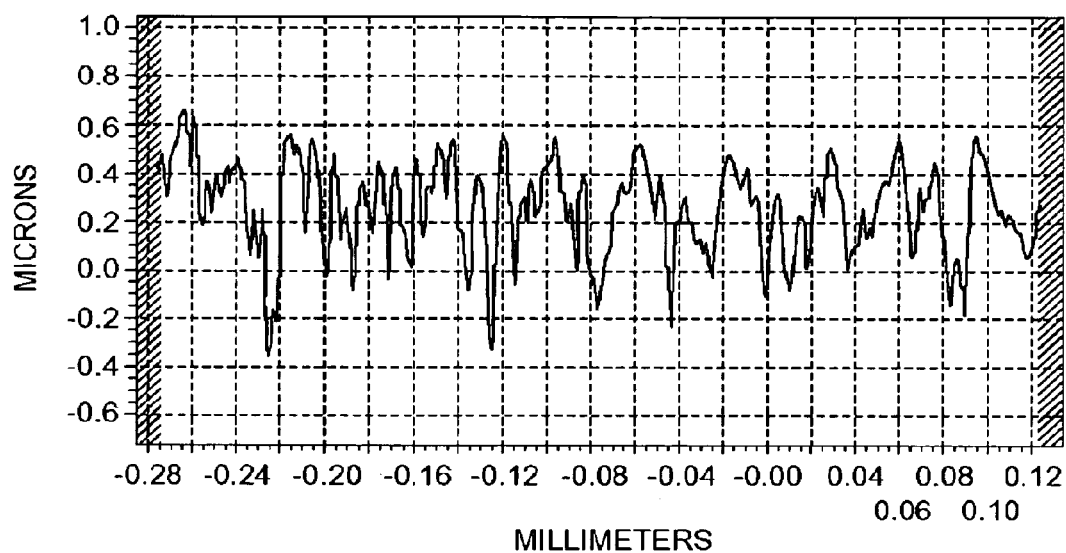
FIG. 28 is a graph showing one example of a shape measurement result in a certain radial direction of the roughened lens surface measured by using the probe contact type measuring apparatus.

FIG. 28 is a graph showing one example of a shape measurement result in a certain radial direction of the roughened lens surface. In FIG. 28, the ordinate shows deviation (μm) of the shape of the measured lens from a reference lens shape, and the abscissa shows a distance (mm) from the optical axis of the lens in the radial direction. The reference lens shape means a lens shape that is designed so as to best fit the actual lens shape, or a lens shape which is formed by homogeneously deforming the designed lens shape. Therefore, FIG. 28 shows the deviation of the actual lens shape from the designed lens shape or the lens shape analogously deformed.

As shown in FIG. 28, the roughened surface has a finely random concave/convex shape without any regularity. The arithmetic average roughness Ra shown in FIG. 28 is about 0.3 μm. Optical characteristics such as a degree of the light distribution unevenness or the color unevenness and a quantity of outgoing light from the illumination optical system change with the surface roughness.

Figure 2:
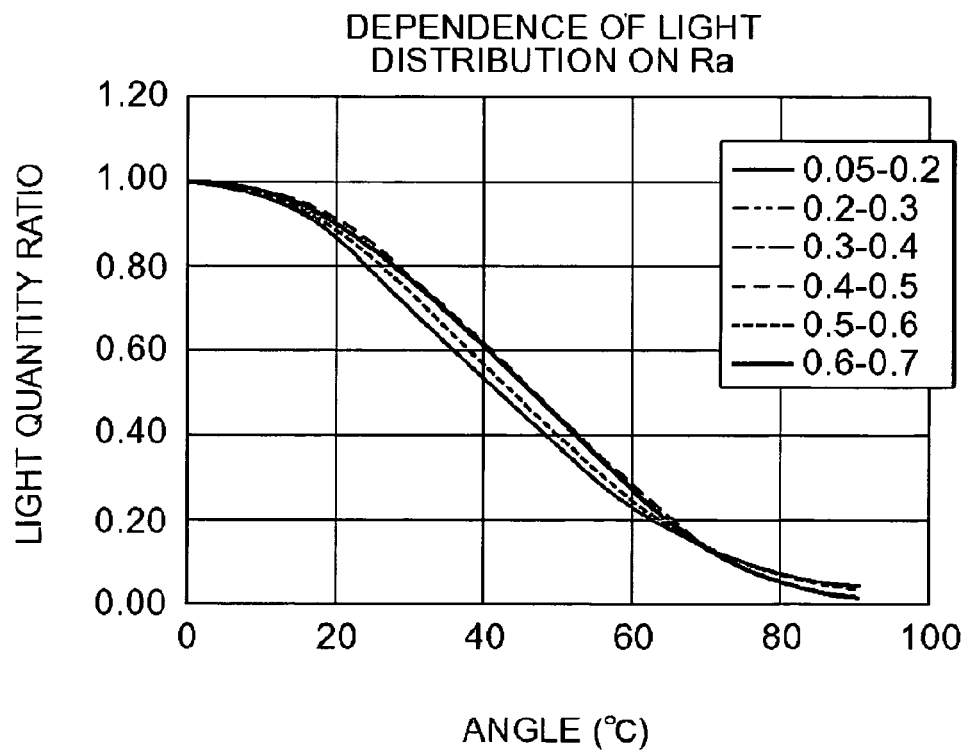
FIG. 2 is a graph showing the relation between the arithmetic average roughness Ra of the convex surface of the plano-convex lens in the illumination optical system and changes of light distribution characteristics of the illumination optical system shown in FIGS. 1A and 1B.

FIG. 2 is a graph showing light distribution characteristics in a case where the arithmetic average roughness Ra of the convex surface of the piano-convex lens shown in FIG. 1A is changed. In FIG. 2, the ordinate shows a normalized quantity (%) of light when a light quantity in the center of the illuminated field is assumed to be 1, and the abscissa shows a light emission angle (°) (half of the light distribution angle) from the lens. FIG. 2 shows the characteristics in a case where the illuminated object surface is a spherical shape. The values written in the legend indicate the arithmetic average roughness Ra. As shown in FIG. 2, when the roughened state becomes coarse, that is, when the arithmetic average roughness Ra increases, the light quantity rises in a range where the light emission angle exceeds 70°, and the light distribution characteristics are broadened.

Figure 3:
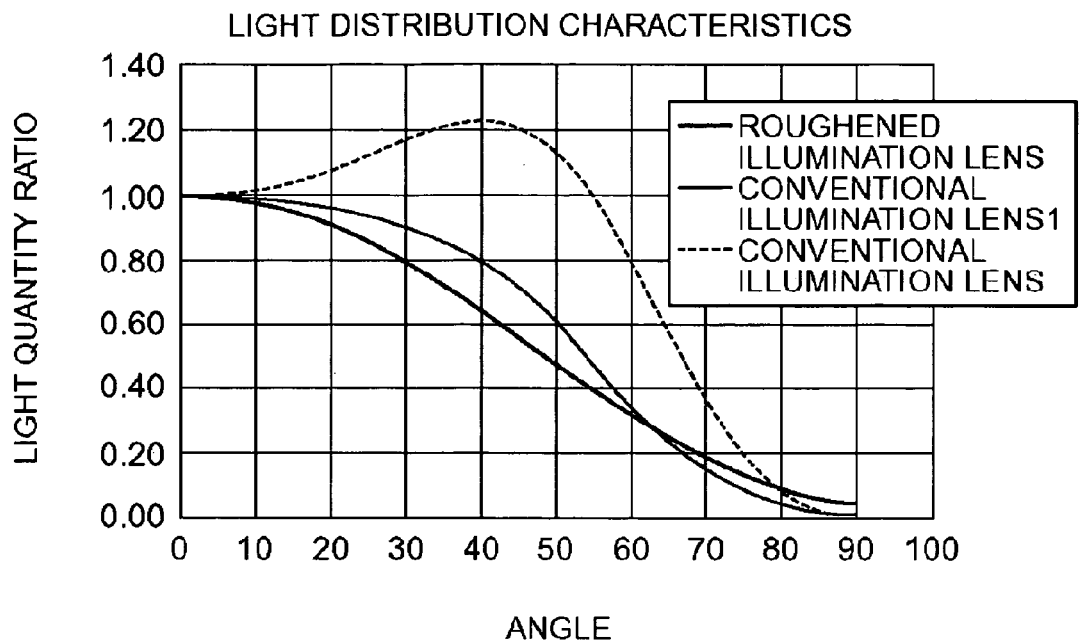
FIG. 3 is a graph showing comparative examples of the light distribution characteristics of an illumination optical system which does not include roughened surface, and those of the illumination optical system having the roughened surface.

FIG. 3 is a graph showing comparative examples of the light distribution characteristics of a conventional illumination optical system which has only polished surface(s) and which does not have any roughened surface, and those of an illumination optical system in which a roughened surface is disposed to broaden the light distribution. In FIG. 3, the ordinate shows a normalized quantity (%) of light when the light quantity in the center of the illuminated field is assumed to be 1, and the abscissa shows a light emission angle (°) from the lens. FIG. 3 shows the characteristics in a case where the illuminated object surface has a spherical shape. Moreover, in FIG. 3, a bold line shows the light distribution of the illumination optical system provided with the roughened surface, and the other lines show the light distributions of the illumination optical systems which do not have any roughened surface.

As shown in FIG. 3, as to the light distribution value in an area where the emission angle exceeds 80°, the light quantity value is higher in the illumination optical system provided with the roughened surface. The area where the emission angle exceeds 80° is hardly illuminated with the illumination light in the conventional illumination optical system, but the quantity of light is 3% or more even in the area of an emission angle of 85° in the roughened illumination optical system. It is difficult to realize this quantity of light in an illumination optical system that does not have any roughened surface.

Next, a method of indirectly measuring the roughness of the lens surface will be described.

A measuring apparatus that utilizes the properties of a polished surface cannot be used in indirectly measuring the shape of a roughened surface. Therefore, an example will be described with reference to FIG. 29. In the example, a computerized numerical control (CNC) image measuring apparatus (e.g., QV Series manufactured by Mitsutoyo Corporation) may be used as a non-contact type measuring apparatus.

Figure 29:
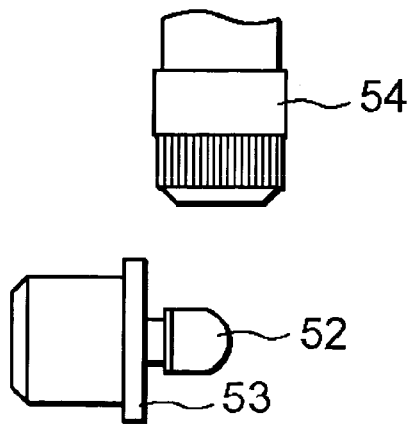
FIG. 29 is an explanatory view showing the method of measuring the shape of the lens surface by a non-contact type measuring apparatus, and schematically showing an observing section of a CNC image measuring apparatus for explaining the principle of the measurement.

FIG. 29 is an explanatory view showing the method of measuring the shape of the lens surface with the non-contact type measuring apparatus, and schematically showing an observing section of the CNC image measuring apparatus for explaining the principle of the measurement.

Figure 30:
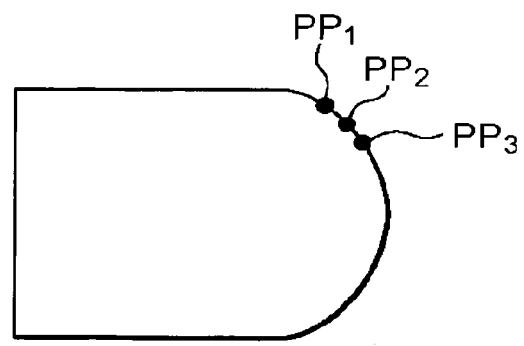
FIG. 30 is an explanatory view showing the shape measurement of the lens surface by the non-contact type measuring apparatus.

As shown in FIG. 29, when a lens 52 fixed to a lens holder 53 is observed from a side surface with an observation lens 54, the image shown in FIG. 30 is acquired. Then the positions PP1, PP2, PP3, . . . of contour points used for measuring the shape of the lens 52 are determined. By analyzing the positions of these contour points, the shape or the roughness of the roughened surface can be obtained.

Figure 31:
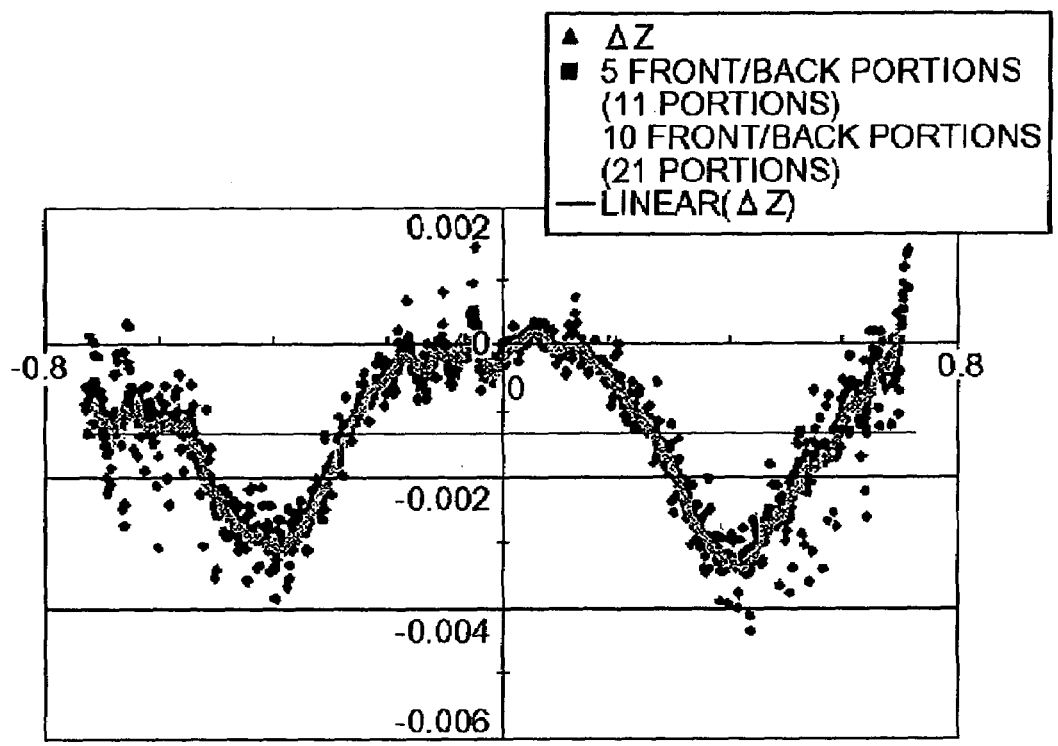
FIG. 31 is a graph showing one example of a measurement result by the CNC image measuring apparatus that is a non-contact type measuring apparatus.
Figure 33A:
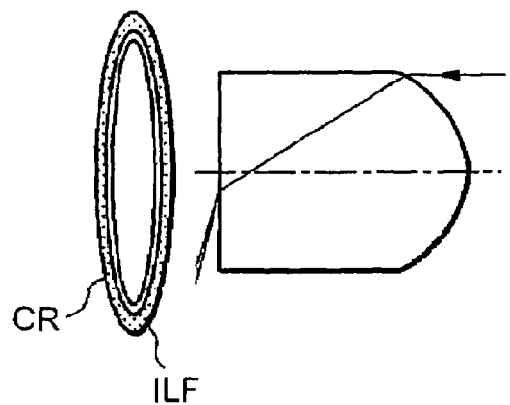
FIGS. 33A and 33B are explanatory views of color unevenness.
Figure 33B:
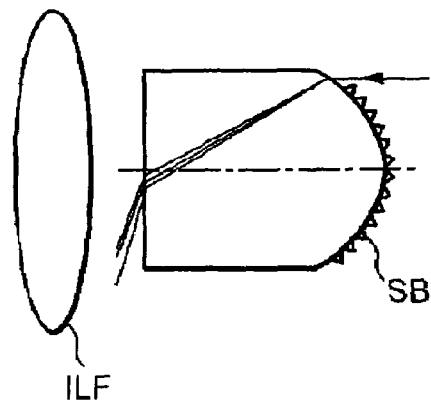
Figure 32A:
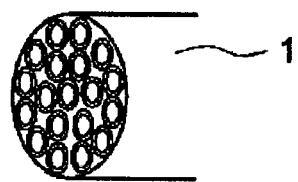
FIG. 32A is a perspective view showing an arrangement of fibers in the end surface of a light guide fiber bundle.
Figure 32B:
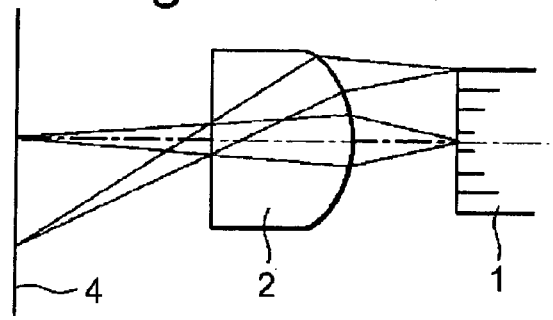
FIG. 32B is an explanatory view showing one example of a conventional illumination optical system.
Figure 32C:
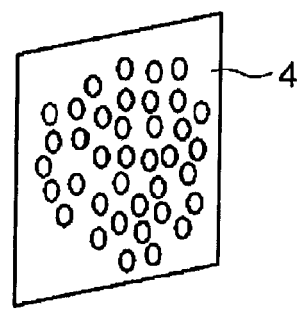
FIG. 32C is an explanatory view showing light distribution unevenness in the illumination optical system of FIG. 32B.
Figure 34:
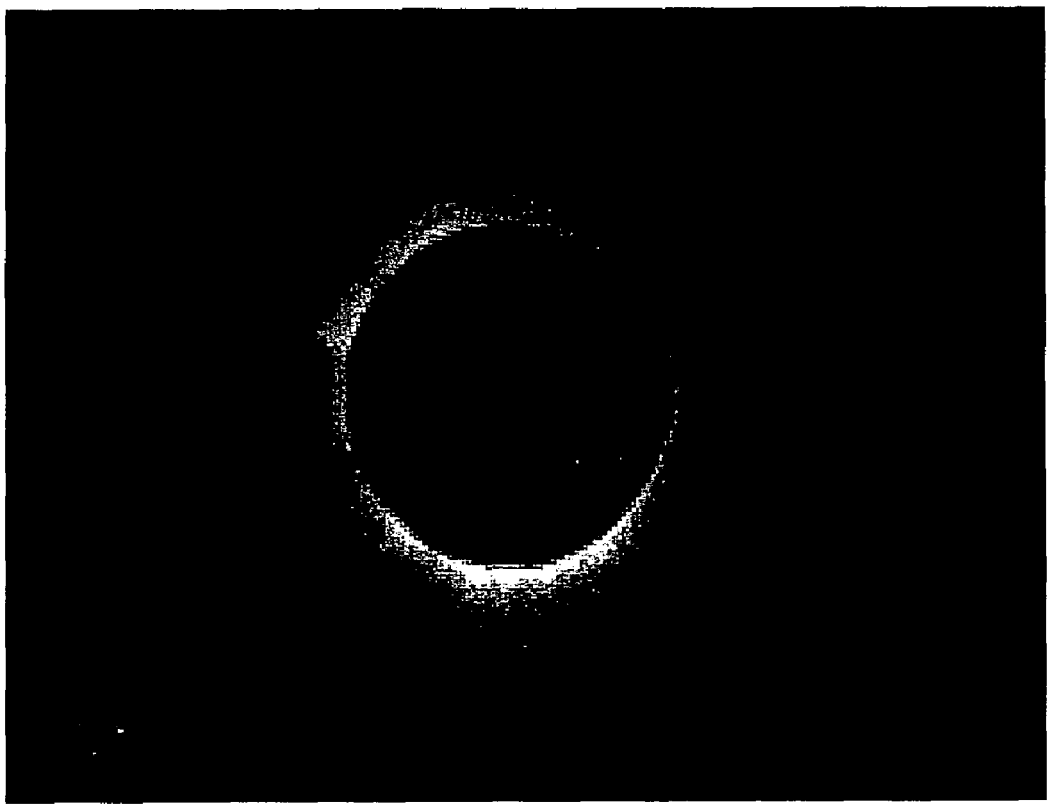
FIG. 34 is an explanatory view showing light distribution unevenness generated in the peripheral portion of an illumination field.

FIG. 31 is a graph showing one example of a measurement result obtained with the CNC image measuring apparatus. In FIG. 31, the ordinate shows deviation (μm) of the shape of the measured lens from a reference lens shape, and the abscissa shows a distance (mm) from the optical axis of the lens in radial direction. The measurement method using the CNC image measuring apparatus is a method applicable to a case where the shape of the convex surface is measured in a non-contact manner. When a three-dimensional shape measuring apparatus (e.g., NH-3SP of non-contact type manufactured by Mitaka Kohki Co., Ltd.) is used as the non-contact measuring apparatus, the shape of the concave surface can be measured in a non-contact manner. It is to be noted that the roughness of the roughened surface can be measured in a non-contact manner by either of the above-described methods.

Next, the relationship between roughness (arithmetic average roughness) Ra of the roughened lens surface and optical characteristics will be described.

Figure 4:
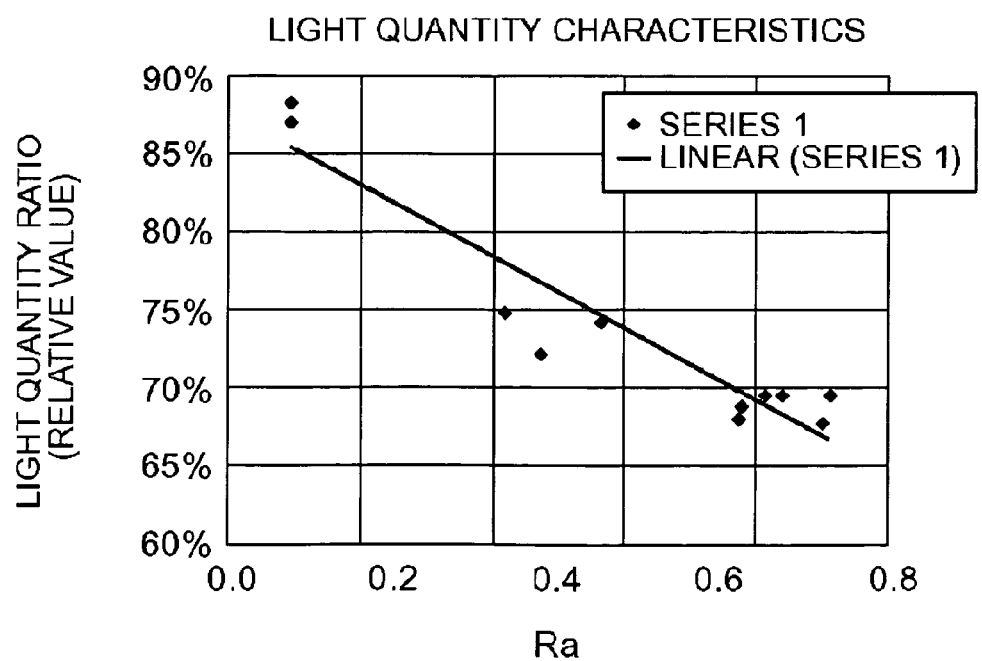
FIG. 4 is a graph showing the relationship between the arithmetic average roughness Ra of the roughened surface (convex surface), and the light quantity characteristics of the plano-convex lens shown in FIGS. 1A and 1B.

FIG. 4 is a graph showing light quantity characteristics in a case where the arithmetic average roughness Ra of the roughened surface (convex surface) is changed in the plano-convex lens shown in FIG. 1A. In FIG. 4, the ordinate shows a quantity (%) of light of a roughened lens when the quantity of light of an illumination optical system formed only of polished surface(s) is set to 1, and the abscissa shows Ra (μm).

As shown in FIG. 4, there is a negative correlation between the arithmetic average roughness Ra and the quantity of light. When the arithmetic average roughness Ra increases, the quantity of light outgoing from the lens decreases. In the example shown in FIG. 4, when the arithmetic average roughness Ra is about 0.75 μm, a quantity of light of about 70% can be secured. That is, to secure a quantity of light of 70% or more, the arithmetic average roughness Ra needs to be set to about 0.75 μm or less.

In working the roughened lens surface of the illumination optical system, the value of the required arithmetic average roughness Ra is determined in consideration of the balance between the reduction of illumination unevenness, the light distribution characteristics, and the loss of the quantity of light. Even when a higher priority is placed on the broadening of the light distribution, the arithmetic average roughness Ra is preferably set to about 0.75 μm or less.

On the other hand, even when a higher priority is placed on the reduction of the loss of the quantity of light, the arithmetic average roughness Ra is preferably set to at least 0.05 μm or more. Especially, when the light distribution needs to be broadened at a light distribution angle of 150° or more, the arithmetic average roughness Ra is preferably in a range of about 0.1 µm to 0.75 µm.

On the other hand, when the light distribution does not have to be broadened at a light distribution angle of 150° or more, the arithmetic average roughness Ra is preferably in a range of about 0.05 µm to 0.5 µm. In this case, a quantity of light of 75% or more can be secured.

Figure 5:
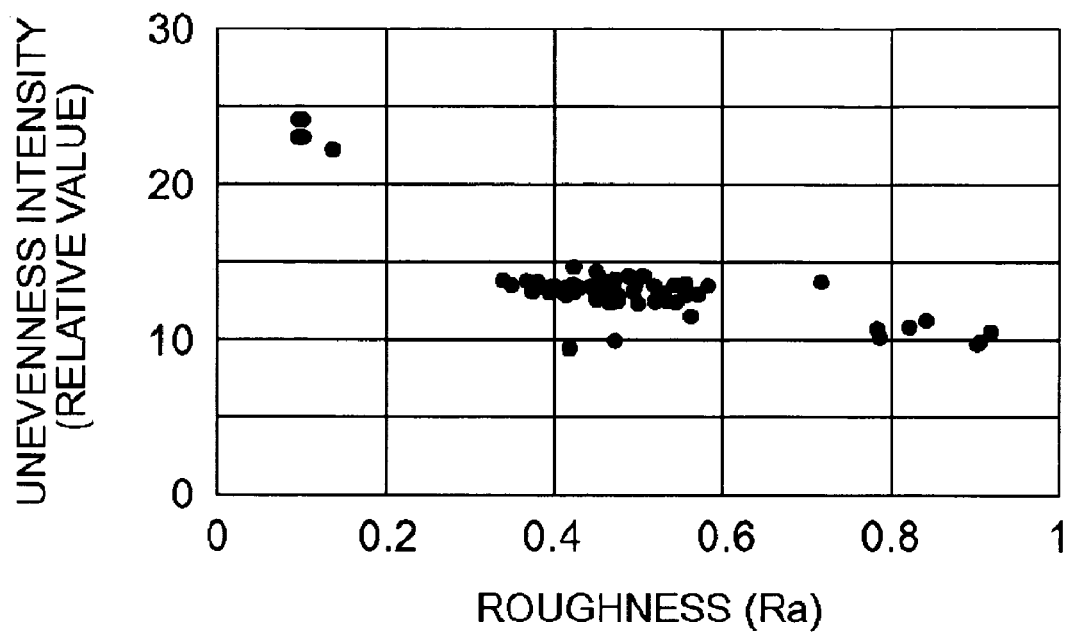
FIG. 5 is a graph showing the relationship between the arithmetic average roughness Ra of the roughened surface (convex surface), and light distribution unevenness of the plano-convex lens shown in FIGS. 1A and 1B.

FIG. 5 is a graph showing the relation between the arithmetic average roughness Ra of the roughened surface (convex surface), and the light distribution unevenness in the plano-convex lens shown in FIG. 1A. In FIG. 5, the ordinate shows the intensity of the light distribution unevenness (relative value), and the abscissa shows the arithmetic average roughness Ra (µm). As shown in FIG. 5, when the arithmetic average roughness Ra is a little less than 0.8 or greater than that, the intensity of the light distribution unevenness is almost constant. That is, even if the surface is further roughened, the light distribution unevenness is unchanged. Additionally, as shown in FIG. 4, when the arithmetic average roughness Ra increases, the loss of the quantity of light increases. Therefore, it is desirable to set the arithmetic average roughness Ra to 0.75 or less in order to reduce the loss of quantity of light. On the other hand, as shown in FIG. 5, when the arithmetic average roughness Ra decreases, the light distribution unevenness gradually becomes evident. However, when the arithmetic average roughness Ra is about 0.05, the light distribution unevenness is less evident than in the conventional illumination optical system.

As described above, to reduce the unevenness of the illumination light, the roughened surface is preferably rougher. However, when the surface is excessively rough, a loss of the quantity of light increases. On the other hand, the rougher surface is more advantageous in broadening the light distribution, because the light distribution is broadened by the diffusing effects of the roughened surface. Therefore, when the surface is actually roughened, an optimum roughness level needs to be determined in such a manner that the roughness (arithmetic average roughness) Ra of the lens surface is well balanced with the optical characteristics.

The deviation of the actual shape of the lens surface from the reference lens shape can be considered in two aspects, one of which is the above-described arithmetic average roughness Ra and the other of which is corrugation that indicates the change of shape at a low frequency as compared with the arithmetic average roughness Ra. In this application, a shape change of 0.05 mm or more in one cycle in the radial direction is treated as corrugation.

Figure 6:
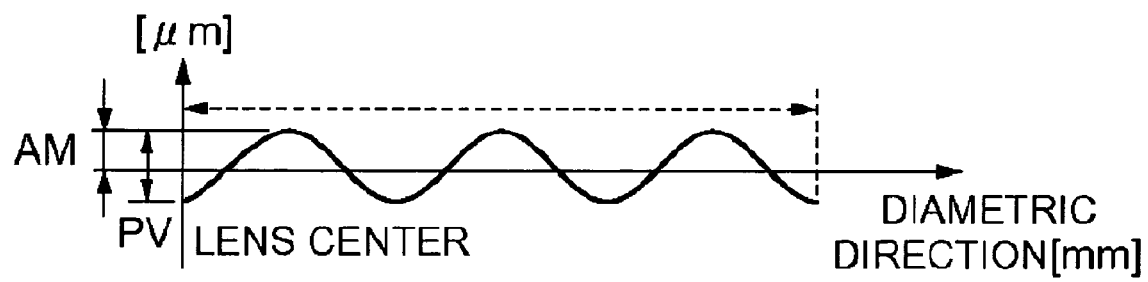
FIG. 6 is a schematic explanatory view showing corrugation of the lens surface.

FIG. 6 is a schematic explanatory view showing the corrugation of the lens surface. In FIG. 6, the ordinate shows deviation (µm) of the shape of actual lens surface from a reference lens surface, and the abscissa shows a distance (mm) from the optical axis of the lens in the radial direction. In this application, the number of periodically repeated shape deviations shown in FIG. 6 is assumed as the frequency or the number of corrugations, and an amplitude AM of the shape deviation is assumed as the amplitude of the corrugation.

The lens surface is usually formed into a rotationally symmetric shape with respect to the optical axis of the lens. Therefore, the shape deviation shown in FIG. 6 is the same in any radial direction. As a result, the frequency of the corrugation in the range of the diameter of the lens surface is twice that in the range of the radius of the lens surface. In FIG. 6, the frequency of the corrugation is about three in the range of the radius of the lens surface, and about six in the range of the diameter of the lens surface.

When the amplitude of the corrugation is considered in terms of a peak-to-valley (PV) value, PV=amplitude×2 results. In this case, when the amplitude is not constant, a maximum value of the amplitude is assumed as the PV value.

The number of the corrugations and the corrugation amplitude influence the light distribution unevenness, the quantity of light, the light distribution characteristics and the like. When the number of the corrugations is large, changes of brightness and darkness in the light distribution characteristics will occur especially in the vicinity of the center of the illuminated area, and the illumination unevenness is generated. When the amplitude of the corrugation is large, the quantity of light especially in the center of the illuminated area drops. However, in the illumination optical system, the lens shape does not have to be highly precise compared with an image forming optical system. Therefore, the number and the amplitude of the corrugations can be determined in consideration of the workability of the lens and optical characteristics such as illumination unevenness.

When the number of the corrugations is 20 or less over the diameter of the lens surface, the illumination unevenness can be suppressed, and performance of the lens is little influenced. However, to further stabilize the lens performance, the number of the corrugations is preferably ten or less, if possible. When the amplitude of the corrugation is about 25 µm, the quantity of light does not largely drop in the center of the illuminated area. However, to secure more stable optical characteristics, the amplitude of the corrugation is preferably set to 20 µm or less. If possible, the amplitude is preferably set to 10 µm or less, so that the influences on the optical characteristics become negligible. It is to be noted that when the amplitude of the corrugation is considered in terms of the PV value, the allowable range is twice the above-described numeric value.

Figure 7:
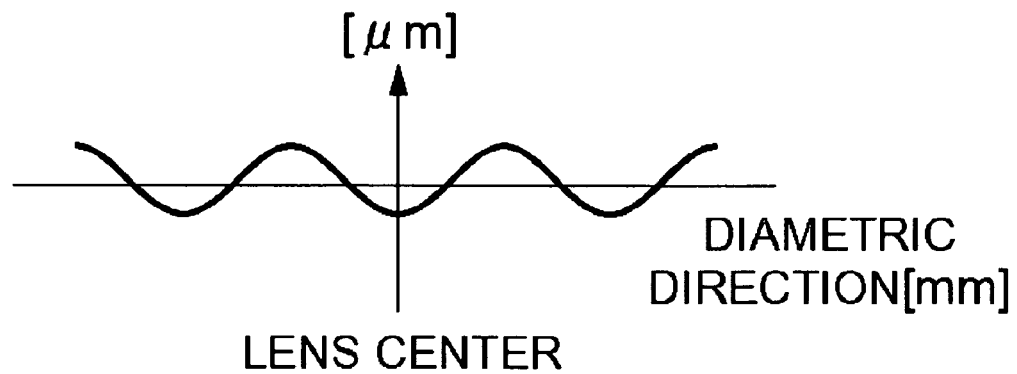
FIG. 7 is an explanatory view showing an M-type corrugated shape.
Figure 8:
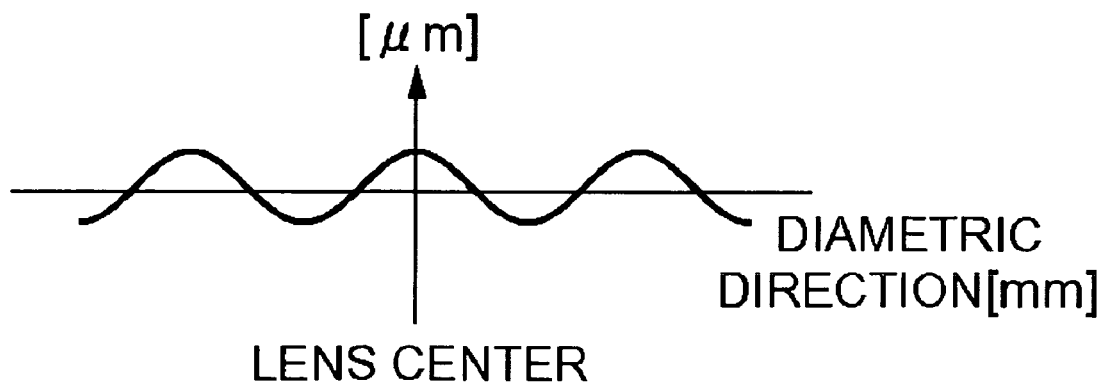
FIG. 8 is an explanatory view showing a W-type corrugated shape.

The shape of the corrugation is considered in the diametric area of the lens surface (from end to end of the diameter). Since the lens shape slightly changes with the direction of the diameter on the lens surface, the shape may be measured in a plurality of portions. Additionally, when the lens surface has an area that does not pass a light ray, the shape is considered in an effective area that passes a light ray. The corrugation has a shape like a sinusoidal wave, and the shape of the corrugation in the central area of the lens surface may be an M-type shape shown in FIG. 7, or a W-type shape shown in FIG. 8.

Moreover, when the lens surface is formed into an aspherical surface, the light distribution performance can be easily changed as compared with the spherical surface. Therefore, when an aspherical surface is roughened, the light distribution can be further broadened by the diffusing effects of the surface. Assuming that an optical axis direction is Z, a height from the optical axis is y, and a light traveling direction is positive, the shape of an aspherical surface Z(y) is represented by the following equation:

$$Z(y) = \frac{(1/R) \cdot y^2}{1 + \sqrt{\{1 - (k+1) \cdot (1/R)^2 \cdot y^2\}}} + A2 \cdot y^2 + A4 \cdot y^4 + \ldots + An \cdot y^n$$

where R denotes a radius of curvature of the lens surface, k denotes a conic constant, A2 denotes a 2nd order aspherical coefficient, A4 denotes a 4th order aspherical coefficient, and An denotes an n-th order aspherical coefficient. Since the shape of the lens surface is rotationally symmetric with respect to the optical axis, the shape needs to be defined by a term of an even order.

The generation level of the light distribution unevenness changes with a dot-matrix structure of the end surface of a light guide fiber bundle. A light guide fiber bundle is formed by assembling a large number of fibers each comprising a core portion which transmits the light and a cladding portion which confines the light in the core portion, and there are gaps formed by adhesives or the like among the cladding portions of the fibers constituting the light guide fiber bundle. A filling factor is defined as a ratio of a sum of sectional areas of the fibers included in the sectional area of the light guide fiber bundle to the sectional area of the light guide fiber bundle, and is usually about 70% to 80%. However, only the core portion in the section of the fiber actually shines, and the cladding portion does not shine. The gap between the cladding portions in the light guide fiber bundle does not shine. Therefore, the filling factor does not effectively represent the area of the core portion which shines at the end surface of the light guide fiber bundle.

The dot-matrix structure of the light guide fiber bundle is noticeable, when the areas that do not shine increase and the difference between the brightness and the darkness becomes clear. Therefore, the generation level of the light distribution unevenness changes with the relation between the area of the shining core, and the area other than the core, that does not shine. To reduce the conspicuousness of the light distribution unevenness, when the light guide fiber bundles have equal outer diameters, the ratio of the core area in the light guide fiber bundle may be increased. Therefore, even when the fibers have equal outer diameters, the filling factor may be raised to reduce the gaps among the fibers. When the filling factor is unchanged, the thicknesses of the cladding portions or the like may be reduced in the fibers having the equal outer diameters to increase core diameters.

Figure 9:
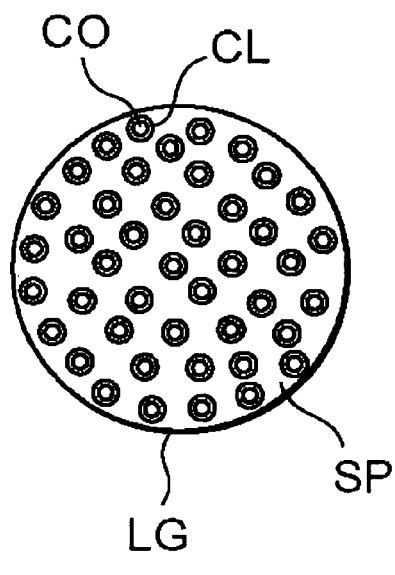
FIG. 9 is an explanatory view showing an example of an end surface of a light guide fiber bundle.
Figure 10:
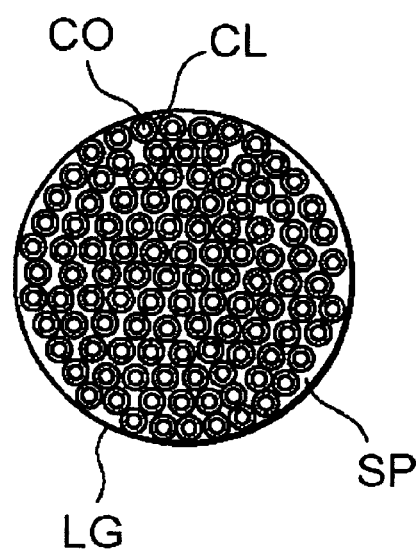
FIG. 10 is an explanatory view showing another example of an end surface of the light guide fiber bundle having larger filling factor of fibers.

For example, as shown in FIG. 9, in a light guide fiber bundle LG, there is a large gap SP between fibers each comprising a core CO and a cladding layer CL. Dark areas which do not pass the light increase, and the dot-matrix structure is conspicuous. Therefore, a light distribution unevenness is easily generated. However, when the filling factor of the fibers is raised as shown in FIG. 10, the area of the gap SP generated between the fibers narrows. Therefore, the dark areas decrease, and a light distribution unevenness is not easily generated.

Figure 11:
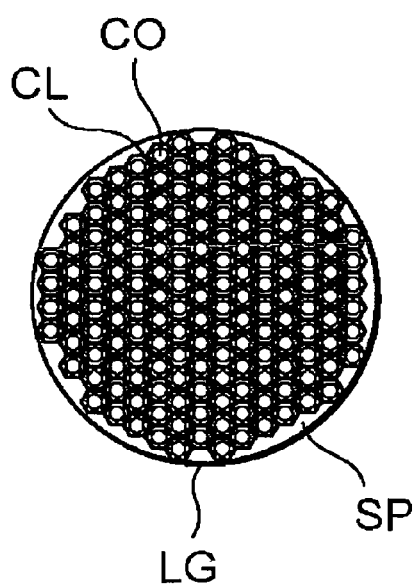
FIG. 11 is an explanatory view showing still another example of an end surface of the light guide fiber bundle having larger filling factor of fibers.

For example, an end portion of the light guide fiber bundle LG may be pressurized from the outside and caulked. Accordingly, the gaps SP between the cladding layers are reduced, and the filling factor of the fibers is raised to form a pressurized light guide fiber bundle. Furthermore, as shown in FIG. 11, a fusion-bonded light guide, in which the cladding layers are fused and integrated, is preferably formed. In the fusion-bonded light guide fiber bundle LG shown in FIG. 11, there is not any gap between the cladding layers CL of the fibers, and each core CO is coated with only the cladding layer CL. When the thickness of the cladding layer in the fiber is further reduced, the light distribution unevenness is further improved, and the roughness level of the roughened surface may be finer. However, it must be noted that, since the thickness of the cladding layer needs to be about several micrometers in order to confine the light in the core, the cladding layer cannot be completely eliminated.

When the light guide fiber bundle described above is used, a bright illumination optical system may be obtained in which a light distribution unevenness is not easily generated. Moreover, in an illumination optical system combined with a light guide fiber bundle, since the light distribution unevenness is reduced, a finely roughened surface can be used. Additionally, to reduce the color unevenness or to broaden the light distribution, the arithmetic average roughness Ra needs to be about 0.05 or more, even in a case where the surface roughness is the finest.

Next, a light guide fiber bundle that is preferable for use with the illumination optical system of the present invention will be described.

One example of the preferable light guide fiber bundle has a fiber diameter of 40 μm, a core diameter of 35 μm, a light guide fiber bundle diameter of 3 mm, 4218 fibers, and a filling factor of 75%. Here, when the fiber has a core sectional area S1' of 0.000962 mm$^2$, the total sectional area S1 of the core portion is S1=0.000962×4218=4.058 mm$^2$. Therefore, when the light guide fiber bundle has a sectional area S0 of 7.069 mm$^2$, a ratio ΔS of the total sectional area S1 of the core portions with respect to the sectional area S0 of the light guide fiber bundle (ΔS=S1/S0) equals to 4.058÷7.069=0.574. Light guide fiber bundles having various fiber diameters and filling factors can be constituted. A light guide fiber bundle for use in combination with the illumination optical system of the present invention will provide satisfactory optical characteristics when constructed in such a manner as to obtain a ratio ΔS of about 0.5 or more.

It is to be noted that even a light guide fiber bundle having a ratio ΔS of about 0.5 or less may be applied to the illumination optical system of the present invention. However, when the ratio ΔS decreases, a light distribution unevenness is easily generated by the dot-matrix structure of the light guide fiber bundle. Therefore, the lens surface of the illumination optical system needs to be more roughened, and the loss of the quantity of light further increases. Consequently, a light guide fiber bundle having a ratio ΔS that is large enough that the light distribution unevenness is prevented from being generated may be used.

For example, when the fiber diameter is set to 38 μm to reduce the thickness of the cladding layer in the above-described light guide fiber bundle, 4674 fibers constitute the bundle even with an equal filling factor of 75%. Therefore, the ratio ΔS=S1/S0=4.496/7.069=0.636 results.

Furthermore, when the ratio ΔS is 0.6 or more, a light distribution unevenness is not easily generated. Therefore, especially when the brightness is given priority, through the use of a light guide fiber bundle having a ratio ΔS of 0.6 or more, the roughness level of the roughened lens surface of the illumination optical system can be reduced, and the loss of the quantity of light can be reduced. When the ratio ΔS is 0.6 or more, the core area increases as compared a light guide fiber bundle having a ratio ΔS of 0.574, the quantity of light guided by the light guide fiber bundle also increases, and the brightness is enhanced.

Embodiments of the present invention will be described hereinafter more specifically.

EMBODIMENT 1

FIG. 1 shows diagrams of Embodiment 1 of an illumination optical system. FIG. 1A is a sectional view along an optical axis, and FIG. 1B is an explanatory view showing that illumination light parallel to the optical axis is projected via the illumination optical system.

The illumination optical system 2 of Embodiment 1 comprises a piano-convex lens having a flat surface on the object side and a convex surface on the light guide fiber bundle side. The convex surface r2 of the plano-convex lens is an aspherical surface, and the aspherical surface is roughened. This roughened surface prevents generation of light distribution unevenness and color unevenness. The plano-convex lens is disposed in such a manner that the convex surface r2 is brought into contact with an emission end surface r3 of the light guide fiber bundle 1. The arithmetic average roughness Ra of the roughened surface is about 0.3 μm. The arithmetic average roughness Ra may be in a range of 0.05 to 0.75 μm.

According to the illumination optical system 2 of Embodiment 1, since the convex surface is formed as a roughened aspherical surface, broader light distribution characteristics can be obtained than before as described above.

On the other hand, although the light distribution is broadened, roughness of the roughened surface is optimized. Therefore, there is not much loss of the quantity of light due to the roughened surface. Even as compared with an illumination optical system that does not have any roughened surface, the loss of the quantity of light is about 30% at most, and can be substantially suppressed to about 20 to 25% regardless of the broadened light distribution.

Moreover, since the roughened surface is not disposed on the object side, when this illumination optical system is applied to an endoscope, the problem of mucus, water, dust or the like sticking to the roughened surface and inhibiting desired optical characteristics from being fulfilled does not occur.

Moreover, in Embodiment 1, the plano-convex lens is disposed in such a manner that the convex surface of the lens is brought into contact with the emission end surface of the light guide fiber bundle 1. Therefore, the plano-convex lens and the light guide fiber bundle 1 are easily positioned. This obviates a need for a member such as a spacer ring.

Furthermore, Embodiment 1 is cost effective since only one plano-convex lens is used in the illumination optical system. The lens has a short total length. Therefore, when the lens is applied to the endoscope, the rigid tip portion of the distal end of the endoscope can be shortened. Therefore, especially when the illumination optical system is tilted and disposed on the tip portion of the endoscope, the outer diameter of the endoscope tip portion can be reduced.

Next, numerical data of Embodiment 1 will be described. In the numerical data, r1, r2 . . . denote radii of curvature of optical surfaces, d1, d2 . . . denote thicknesses of lenses or air intervals between the optical surfaces, nd1, nd2 . . . denote refractive indices of the respective lenses at the wavelength of d-line, and vd1, vd3 . . . denote Abbe numbers at the d-line. The focal length in each embodiment is given as a value at the d-line. The aspherical coefficient is indicated by an n-th order aspherical coefficient used in the above-described equation showing an aspherical shape Z(y). In Embodiment 1, only a 4-th order aspherical coefficient is used, but an aspherical coefficient having another order may be used. Additionally, since the lens surface is symmetric with respect to the optical axis, the aspherical coefficient of an even order should be used. The aspherical coefficient not described has a numeric value of 0. These symbols are common to the following embodiments.

Numerical Data 1

| | | |
|---|---|---|
| r1 = ∞ | d1 = 1.85 | nd1 = 1.883   vd1 = 40.76 |
| r2 = −0.675 (aspherical, roughened surface) | d2 = 0 | nd2 = 1 |
| r3 = ∞ (end surface of light guide fiber bundle) | | |

Aspherical Coefficient
Second surface k=−0.625, A4=−0.1
Arithmetic average roughness Ra of roughened surface: 0.3 [μm]
Corrugations of surface shape in roughened surface: 5 times
PV value of amplitude of corrugation: 15 [μm]
Lens outer diameter: φ1.5
Outer diameter of light guide fiber bundle: φ1.35
NA: 0.6
Interval Pc between cores of light guide fiber bundle: 3 μm
Filling factor of light guide fiber bundle: 75.2%
Sectional area S0 of light guide fiber bundle: 1.431 mm$^2$
Sectional area S1 of core portion of light guide fiber bundle: 0.873 mm$^2$
Ratio of sectional area ΔS: S1/S0=0.61
Distance t from emission surface of lens to illuminated surface: 1.5 mm
Ray height h1 on illuminated surface: 3.394
Maximum ray height h0 of outgoing ray from light guide fiber bundle: 0.675
Ray height ratio Δh: 5.03
Focal length f of whole illumination optical system: 0.764
Refractive power ψ of roughened surface: 1.308
Pc/Ra: 10
|1/f|×Pc/Ra: 13.09 [1/mm]
|1/f|×Pc/Ra×(1/NA): 21.82 [1/mm]

EMBODIMENT 2

Figure 12A:
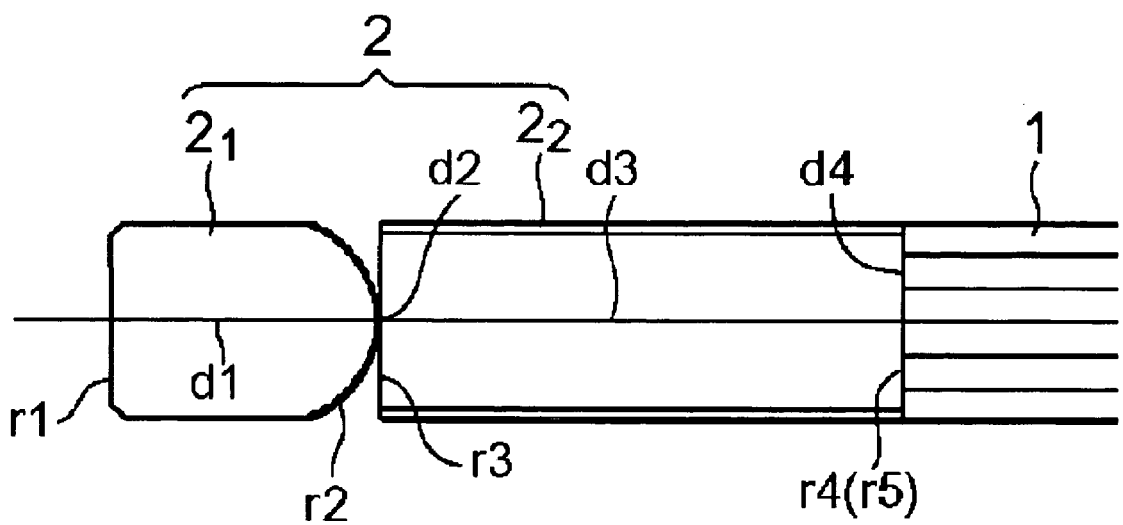
FIGS. 12A and 12B are diagrams showing Embodiment 2 of the illumination optical system according to the present invention.
Figure 12B:
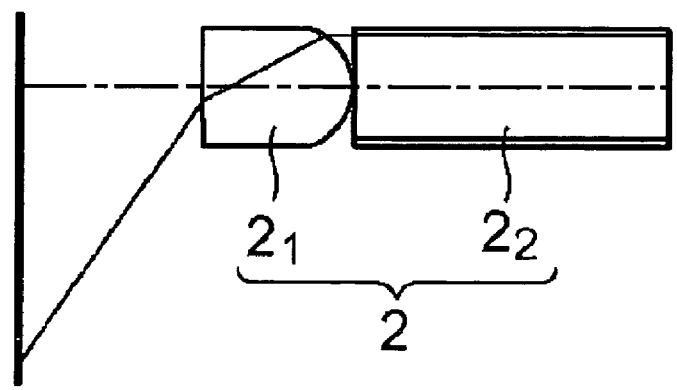

FIGS. 12A and 12B are diagrams showing Embodiment 2 of the illumination optical system. FIG. 12A is a sectional view along an optical axis, and FIG. 12B is an explanatory view showing that illumination light parallel to the optical axis is projected via the illumination optical system.

The illumination optical system 2 of Embodiment 2 comprises: a plano-convex lens 21 having a flat surface on its object side and a convex surface on the light guide fiber bundle side; and a single fiber 22. An incidence end surface r4 of the single fiber 22 is brought into contact with an emission end surface r5 of a light guide fiber bundle 1, and an emission end surface r3 of the single fiber 22 is brought into contact with a convex surface r2 of the plano-convex lens 21. The convex surface r2 of the plano-convex lens 21 is formed as an aspherical surface, and the aspherical surface is roughened. The arithmetic average roughness Ra of the roughened surface is about 0.2 μm. In Embodiment 2, effects of reducing light distribution unevenness by the roughened surface will be small since a single fiber 22 is used. Therefore, in the illumination optical system of Embodiment 2, the arithmetic average roughness Ra of the roughened surface may be in a range of 0.05 to 0.5 μm.

According to the illumination optical system 2 of Embodiment 2, light distribution unevenness and color unevenness are prevented from being generated by a spherical roughened surface formed on the convex surface r2 of the plano-convex lens 21. Moreover, the light distribution unevenness caused by the dot matrix of the light guide fiber bundle 1 is reduced by the single fiber 22. Therefore, in Embodiment 2, the number of optical elements included in the illumination optical system increases, but the roughness level of the roughened surface can be set to be fine as compared with a case where the light distribution unevenness is eliminated only by the effects of the roughened surface. Therefore, the loss of a quantity of light due to the roughened surface can be reduced. The illumination optical system 2 of Embodiment 2 is especially effective in a case where the number of fibers constituting the light guide fiber bundle cannot be increased because of reduction of the diameter of an endoscope, and the quantity of illumination light is therefore small.

Moreover, the roughened surface is not disposed on the emission side (object side) of the illumination optical system. Therefore, this illumination optical system is suitable for an endoscope since the problem of mucus, water, dust or the like sticking to the roughened surface and inhibiting desired optical characteristics from being produced dose not occur.

Moreover, in Embodiment 2, since the plano-convex lens 21 and the single fiber 22 are disposed in such a manner that the convex surface r2 of the lens is brought into contact with the emission end surface r3 of the single fiber, there is no need for a member such as a spacer ring to be disposed between the lens and the single fiber.

Figure 13:
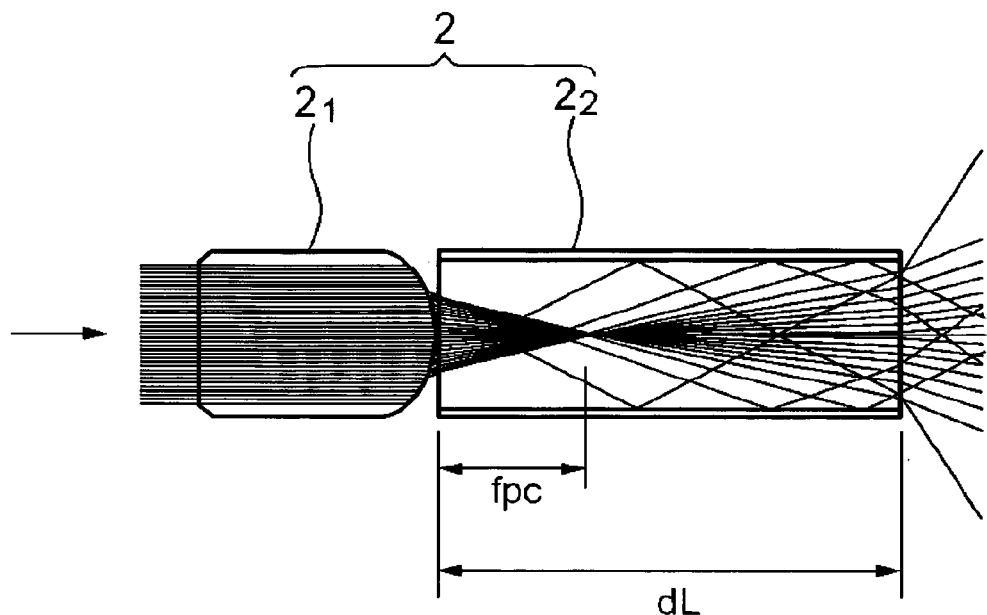
FIG. 13 is an explanatory view showing the state of the light rays in the optical elements in the illumination optical system of Embodiment 2.

The single fiber 22 preferably has sufficient length in order to make the distribution of the illumination light from the light guide fiber bundle 1 uniform. For example, as shown in FIG. 13, the length of the single fiber is set in such a manner that the emission end surface of the light guide fiber bundle is spaced from the position where the rays that enter the illumination optical system 2 from the emission end surface and are in parallel to the optical axis are focused. In this case, the dot-matrix structure of the emission end surface of the light guide fiber bundle is not easily projected as an image on the object surface, and light distribution unevenness caused by the dot matrix is not easily generated. Therefore, when the length dL of the single fiber 22 increases, the outgoing rays from the light guide fiber bundle are preferably mixed in the single fiber. The length of the single fiber needs to be not less than the focal length fpc of the plano-convex lens 21. To satisfy this condition, assuming that the refractive index of the core of the single fiber 22 is n, an equivalent air length of the single fiber 22 is dL/n, and the following needs to be satisfied:

dL/n>fpc/f, wherein f denotes a focal length of the whole illumination optical system.

When the illumination optical system comprises only one positive lens, fpc/f=1 results, and therefore the following needs to be satisfied:

dL/n>1, that is, dL>n.

Therefore, when the refractive index of the core of the single fiber 22 is set to 1.5 or more, the following needs to be satisfied:

dL>1.5.

Next, numerical data of the illumination optical system 2 of Embodiment 2 will be described.
Numerical Data 2

| | | | |
|---|---|---|---|
| r1 = ∞ | d1 = 1.4 | nd1 = 1.883 | vd1 = 40.76 |
| r2 = −0.58 (spherical, roughened) | d2 = 0 | nd2 = 1 | |
| r3 = ∞ (single fiber core) | d3 = 2.7 | nd3 = 1.80518 | vd3 = 25.42 |
| r4 = ∞ | d4 = 0 | nd4 = 1 | |
| r5 = ∞ (end surface of light guide fiber bundle) | | | |

Arithmetic average roughness Ra of roughened surface: 0.2 [μm]
Corrugations of surface shape in roughened surface: 4 times
PV value of amplitude of corrugation: 10 [μm]
Lens outer diameter: φ1
Outer diameter of light guide fiber bundle: φ0.9
NA: 0.6
Interval Pc between cores of light guide fiber bundle: 3 μm
Filling factor of light guide fiber bundle: 76.2%
Sectional area S0 of light guide fiber bundle: 0.636 mm$^2$
Sectional area S1 of core portion of light guide fiber bundle: 0.393 mm$^2$
Ratio of sectional area ΔS: S1/S0=0.618
Distance t from emission end surface of lens to illuminated surface: 1.5 mm
Ray height h1 on illuminated surface: 2.481
Maximum ray height h0 of outgoing ray from light guide fiber bundle: 0.45
Ray height ratio Δh: 5.513
Focal length f of whole illumination optical system: 0.657
Refractive power ψ of roughened surface: 1.522
Length dL of single fiber: 2.7
Refractive index n of core of single fiber: 1.805
Equivalent air length dL/n of single fiber: 1.496
fpc/f: 1
Pc/Ra: 15
|1/f|×Pc/Ra: 22.83 [1/mm]
|1/f|×Pc/Ra×(1/NA): 38.05 [1/mm]

EMBODIMENT 3

Figure 14A:
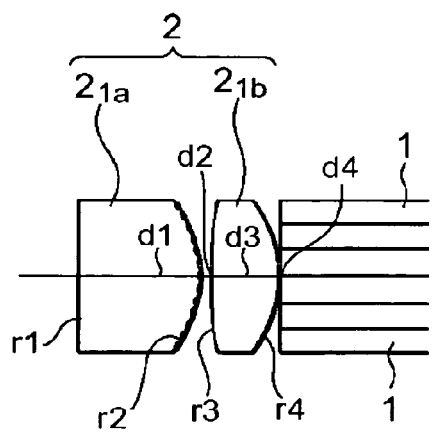
FIGS. 14A and 14B are diagrams showing Embodiment 3 of the illumination optical system according to the present invention.
Figure 14B:
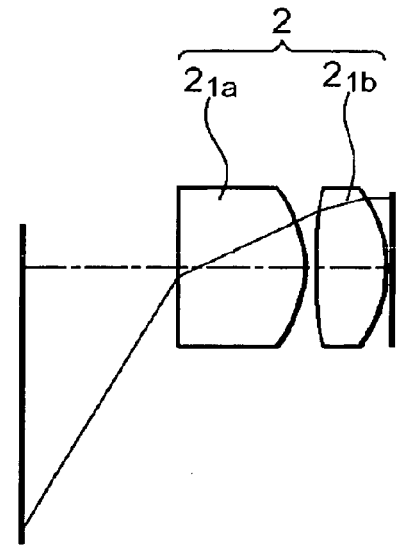

FIGS. 14A and 14B are diagrams showing Embodiment 3 of the illumination optical system. FIG. 14A is a sectional view along the optical axis, and FIG. 14B is an explanatory view showing that illumination light parallel to the optical axis is projected via the illumination optical system.

An illumination optical system 2 of Embodiment 3 comprises: a plano-convex lens 21a having a flat surface on an object side and a convex surface on a light guide fiber bundle side; and a double-convex lens 21b. A convex surface r2 of the plano-convex lens 21a is formed into a spherical shape, and the spherical surface is roughened. In the illumination optical system 2 of Embodiment 3, the lens surface having a small radius of curvature and an intense light refracting action is roughened. Therefore, diffusing effects are easily produced, and light distribution is easily broadened. Light distribution unevenness is suppressed by the roughened surface. Moreover, since the surface disposed near the object surface is roughened, generation of color unevenness is also inhibited.

Next, numerical data of the illumination optical system 2 of Embodiment 3 will be described.
Numerical Data 3

| | | | |
|---|---|---|---|
| r1 = ∞ | d1 = 1.3000 | nd1 = 1.883 | vd1 = 40.76 |
| r2 = −1.6 (spherical, roughened) | d2 = 0.1000 | nd2 = 1 | |
| r3 = 6.0 | d3 = 0.7500 | nd3 = 1.883 | vd3 = 40.76 |
| r4 = −1.6 | d4 = 0 | nd4 = 1 | |
| r5 = ∞ (end surface of light guide fiber bundle) | | | |

Arithmetic average roughness Ra of roughened surface: 0.4 [μm]
Corrugations of surface shape in roughened surface: 6 times
PV value of amplitude of corrugation: 12 [μm]
Lens outer diameter: φ1.8
Outer diameter of light guide fiber bundle: φ1.6
NA: 0.6
Interval Pc between cores of light guide fiber bundle: 3 μm Filling factor of light guide fiber bundle: 75%
Sectional area S0 of light guide fiber bundle: 2.011 mm$^2$
Sectional area S1 of core portion of light guide fiber bundle: 1.224 mm$^2$
Ratio of sectional area ΔS: S1/S0=0.609
Distance t from emission surface of lens to illuminated surface: 1.5 mm
Ray height h1 on illuminated surface: 2.866
Maximum ray height h0 of outgoing ray from light guide fiber bundle: 0.8
Ray height ratio Δh: 3.583
Focal length f of whole illumination optical system: 0.943
Refractive power ψ of roughened surface: 0.552
Pc/Ra: 7.5
|1/f|×Pc/Ra: 7.95 [1/mm]
|1/f|×Pc/Ra×(1/NA): 13.26 [1/mm]

EMBODIMENT 4

Figure 15A:
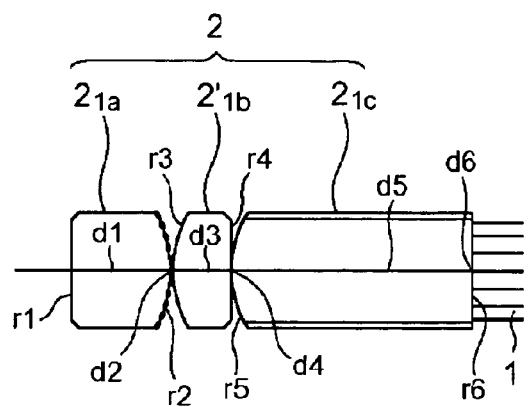
FIGS. 15A and 15B are diagrams showing Embodiment 4 of the illumination optical system according to the present invention.
Figure 15B:
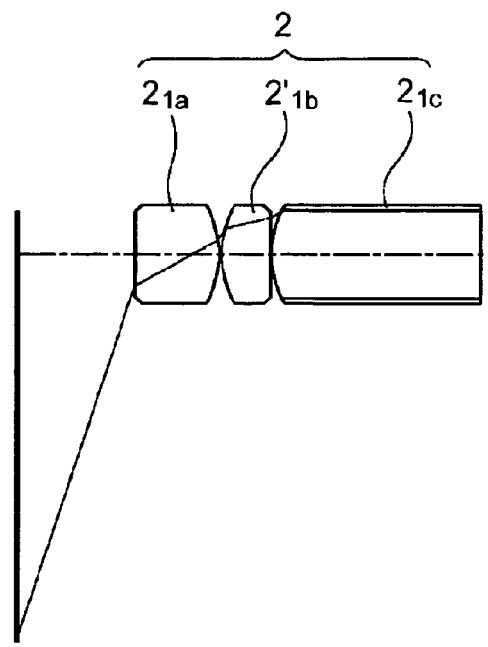

FIGS. 15A and 15B are diagrams showing Embodiment 4 of the illumination optical system. FIG. 15A is a sectional view along an optical axis, and FIG. 15B is an explanatory view showing that illumination light parallel to the optical axis is projected via the illumination optical system.

The illumination optical system 2 of Embodiment 4 comprises: a plano-convex lens 21a having a flat surface on an object side and a convex surface on a light guide fiber bundle side; a plano-convex lens 21b' having a convex surface on the object side, and a flat surface on the light guide fiber bundle side; and a plano-convex lens 21c having a convex surface on the object side, and a flat surface on the light guide fiber bundle side. A convex surface r2 of the piano-convex lens 21a is formed into a spherical shape, and the spherical surface is roughened. The plano-convex lens 21c is formed of a single fiber.

In the illumination optical system 2 of Embodiment 4, the lens surface having a small radius of curvature and an intense light refracting action is roughened. Therefore, diffusing effects are easily produced, and light distribution is easily broadened. Furthermore, light distribution unevenness or color unevenness can be inhibited from being generated, because the surface near the object surface is roughened. Since the single fiber is disposed on the light guide fiber bundle 1 side, the generation of the light distribution unevenness by the dot matrix of the light guide fiber bundle 1 is reduced, and the arithmetic average roughness Ra of the roughened surface is reduced. Accordingly, the loss of a quantity of light because of the diffusion by the roughened surface can be considerably reduced. The positive lenses are in contact with each other at the vertex portions of the lens surfaces. This can obviate a need for a frame member such as a spacer ring.

Next, numerical data of optical members constituting the illumination optical system 2 of Embodiment 4 will be described.

Numerical Data 4

| | | | |
|---|---|---|---|
| r1 = ∞ | d1 = 1.11 | nd1 = 1.88300 | vd1 = 40.76 |
| r2 = −1.502 (spherical, roughened) | d2 = 0.04 | nd2 = 1 | |
| r3 = 1.203 | d3 = 0.65 | nd3 = 1.88300 | vd3 = 40.76 |
| r4 = ∞ | d4 = 0 | nd4 = 1 | |
| r5 = 1.262 (single fiber core) | d5 = 2.75 | nd5 = 1.80518 | vd5 = 25.42 |
| r6 = ∞ | d6 = 0 | nd6 = 1 | |
| r7 = ∞ (end surface of light guide fiber bundle) | | | |

Arithmetic average roughness Ra: 0.1 [μm]
Corrugations: 4 times
PV value of amplitude of corrugation: 8 [μm]
Lens outer diameter: φ1.2
Outer diameter of light guide fiber bundle: φ1.1
NA: 0.6
Interval Pc between cores of light guide fiber bundle: 3 μm
Filling factor of light guide fiber bundle: 76.1%
Sectional area S0 of light guide fiber bundle: 0.95 mm$^2$
Sectional area S1 of core portion of light guide fiber bundle: 0.587 mm$^2$
Ratio of sectional area ΔS: S1/S0=0.618
Distance t from emission surface of lens to illuminated surface: 1.5 mm
Ray height h1 on illuminated surface: 5.106
Maximum ray height h0 of outgoing ray from light guide fiber bundle: 0.55
Ray height ratio Δh: 9.284
Focal length f of whole illumination optical system: 0.610
Refractive power ψ of roughened surface: 0.588
Length dL of single fiber: 2.75
Refractive index n of core of single fiber: 1.805
Focal length fpc of positive lens: 0.767
Equivalent air length dL/n of single fiber: 1.524
fpc/f: 1.257
Pc/Ra: 30
|1/f|×Pc/Ra: 49.18 [1/mm]
|1/f|×Pc/Ra×(1/NA): 81.97 [1/mm]

EMBODIMENT 5

Figure 16A:
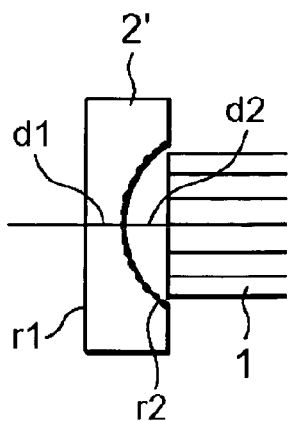
FIGS. 16A and 16B are diagrams showing Embodiment 5 of the illumination optical system according to the present invention.
Figure 16B:
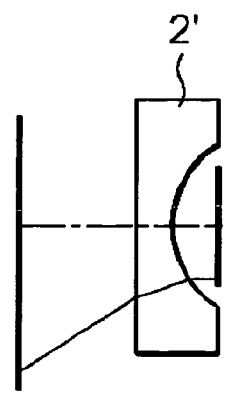

FIGS. 16A and 16B are diagrams showing Embodiment 5 of the illumination optical system. FIG. 16A is a sectional view along an optical axis, and FIG. 16B is an explanatory view showing that illumination light parallel to the optical axis is projected via the illumination optical system.

The illumination optical system 2' of Embodiment 5 comprises a plano-concave lens having a flat surface on an object side and a concave surface on a light guide fiber bundle side. A concave surface r2 of the piano-concave lens is formed into a spherical surface, this spherical surface is roughened, and a broad illuminated area can be obtained. According to the illumination optical system 2' of Embodiment 5, the lens uniformly diffuses the light rays in the peripheral portion as well as in the central portion thereof, and uniform light distribution can be obtained. Since the roughened surface is formed on the concave surface, the radius of curvature of the concave surface need not be reduced much because of diffusing effects of the roughened surface, and this is advantageous in working the lens.

Next, numerical data of the illumination optical system of Embodiment 5 will be described.

Numerical Data 5

| | | | |
|---|---|---|---|
| r1 = ∞ | d1 = 0.5 | nd1 = 1.88300 | vd1 = 40.76 |
| r2 = 1.392 (spherical, roughened) | d2 = 0.61 | nd2 = 1 | |
| r3 = ∞ (end surface of light guide fiber bundle) | | | |

Arithmetic average roughness Ra of roughened surface: 0.6 [μm]
Corrugations of surface shape in roughened surface: 14 times
PV value of amplitude of corrugation: 15 [μm]

Lens outer diameter: ϕ3.4
Outer diameter of light guide fiber bundle: ϕ1.6
NA: 0.6
Interval Pc between cores of light guide fiber bundle: 3 μm
Filling factor of light guide fiber bundle: 75%
Sectional area S0 of light guide fiber bundle: 2.011 mm$^2$
Sectional area S1 of core portion of light guide fiber bundle: 1.224 mm$^2$
Ratio of sectional area ΔS: S1/S0=0.609
Distance t from emission surface of lens to illuminated surface: 1.5 mm
Ray height h1 on illuminated surface: 2.049
Maximum ray height h0 of outgoing ray from light guide fiber bundle: 0.8
Ray height ratio Δh: 2.561
Focal length f of whole illumination optical system: −1.576
Refractive power ψ of roughened surface: 0.634
Pc/Ra: 5
|1/f|×Pc/Ra: 3.17 [1/mm]
|1/f|×Pc/Ra×(1/NA): 5.29 [1/mm]

EMBODIMENT 6

Figure 17A:
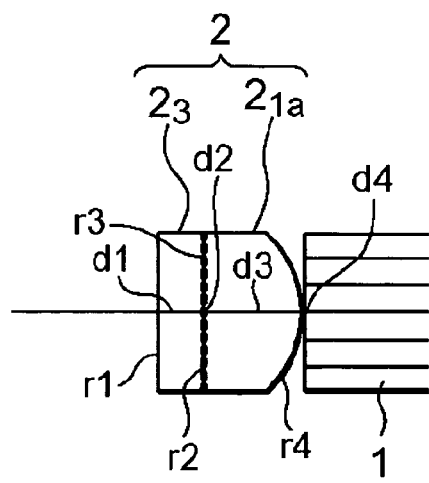
FIGS. 17A and 17B are diagrams showing Embodiment 6 of the illumination optical system according to the present invention.
Figure 17B:
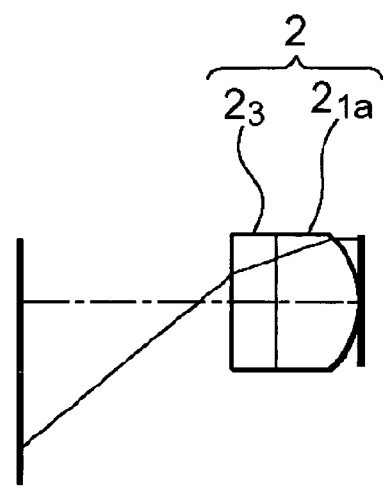

FIGS. 17A and 17B are diagrams showing Embodiment 6 of the illumination optical system. FIG. 17A is a sectional view along an optical axis, and FIG. 17B is an explanatory view showing that illumination light parallel to the optical axis is projected via the illumination optical system.

In the illumination optical system 2 of Embodiment 6, a plane parallel plate 23 is disposed on an object side of a plano-convex lens 21a that has a flat surface on the object side and a convex surface on a light guide fiber bundle side, and a surface r2 of the plane parallel plate 23 on the light guide fiber bundle side is roughened. Unlike the illumination optical systems of Embodiments 1 to 5, in the illumination optical system 2 of Embodiment 6, since the flat surface is roughened instead of a curved surface, light distribution unevenness or color unevenness can be further prevented from being generated. The surface is easily roughened. In the illumination optical system 2 of Embodiment 6, a convex surface r4 of the plano-convex lens 21 may be roughened.

Next, numerical data of the illumination optical system 2 of Embodiment 6 will be described.

Numerical Data 6

| r1 = ∞ | d1 = 0.3 | nd1 = 1.88300 | vd1 = 40.76 |
|---|---|---|---|
| r2 = ∞ (roughened) | d2 = 0 | nd2 = 1 | |
| r3 = ∞ | d3 = 0.6 | nd3 = 1.88300 | vd3 = 40.76 |
| r4 = −0.7 | d4 = 0 | nd4 = 1 | |
| r5 = ∞ (end surface of light guide fiber bundle) | | | |

Arithmetic average roughness Ra: 0.25 [μm]
Corrugations of surface shape in roughened surface: 3 times
PV value of amplitude of corrugation: 10 [μm]
Lens outer diameter: ϕ1
Outer diameter of light guide fiber bundle: ϕ0.9
NA: 0.6
Interval Pc between cores of light guide fiber bundle: 3 μm
Filling factor of light guide fiber bundle: 76.2%
Sectional area S0 of light guide fiber bundle: 0.636 mm$^2$
Sectional area S1 of core portion of light guide fiber bundle: 0.393 mm$^2$
Ratio of sectional area ΔS: S1/S0=0.618
Distance t from emission surface of plane parallel plate to illuminated surface: 1.5 mm
Ray height h1 on illuminated surface: 1.086
Maximum ray height h0 of outgoing ray from light guide fiber bundle: 0.45
Ray height ratio Δh: 2.413
Focal length f of whole illumination optical system: 0.793
Refractive power ψ of roughened surface: 0
Pc/Ra: 12
|1/f|×Pc/Ra: 15.13 [1/mm]
|1/f|×Pc/Ra×(1/NA): 25.22 [1/mm]

EMBODIMENT 7

Figure 18A:
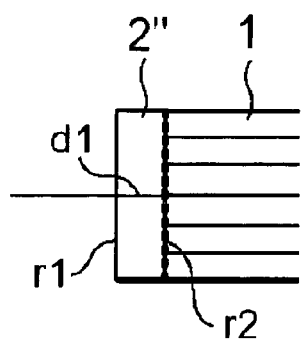
FIGS. 18A and 18B are diagrams showing Embodiment 7 of the present invention.
Figure 18B:
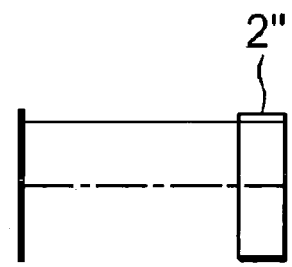

FIGS. 18A and 18B are diagrams showing Embodiment 7 of the illumination optical system. FIG. 18A is a sectional view along an optical axis, and FIG. 18B is an explanatory view showing that illumination light parallel to the optical axis is projected via the illumination optical system.

The illumination optical system 2″ of Embodiment 7 comprises a plane parallel plate disposed on an object side of a light guide fiber bundle 1. A surface r2 of the plane parallel plate on a light guide fiber bundle side is roughened. In the illumination optical system 2″ of Embodiment 7, since the flat surface is roughened instead of a curved surface, light distribution unevenness or color unevenness can be further inhibited from being generated. The surface is easily roughened. In a case where a space for disposing an illumination system is not easily secured, for example, when the system is used as an illumination optical system for a small-diameter endoscope, a sectional shape of the plane parallel plate can be easily worked into an outer shape other than a circular shape, such as a semicircular shape, a crescent shape, or an oval shape. Therefore, the diameter of the endoscope can be inhibited from being enlarged. In this case, the sectional shape of the illumination optical system 2″ may be formed to be analogous to that of an emission end surface of the light guide fiber bundle 1.

Next, numerical data of the illumination optical system 2″ of Embodiment 7 will be described.

Numerical Data 7

| r1 = ∞ | d1 = 0.3 | nd1 = 1.88300 | vd1 = 40.76 |
|---|---|---|---|
| r2 = ∞ (roughened) | d2 = 0 | nd2 = 1 | |
| r3 = ∞ (end surface of light guide fiber bundle) | | | |

Arithmetic average roughness Ra of roughened surface: 0.2 [μm]
Corrugations of surface shape in roughened surface: 3 times
PV value of amplitude of corrugation: 8 [μm]
Lens outer diameter: ϕ1
Outer diameter of light guide fiber bundle: ϕ0.9
NA: 0.6
Interval Pc between cores of light guide fiber bundle: 3 μm
Filling factor of light guide fiber bundle: 76.2%
Sectional area S0 of light guide fiber bundle: 0.636 mm$^2$
Sectional area S1 of core portion of light guide fiber bundle: 0.393 mm$^2$
Ratio of sectional area ΔS: S1/S0=0.618
Distance t from emission surface of plane parallel plate to illuminated surface: 1.5 mm
Ray height h1 on illuminated surface: 0.45
Maximum ray height h0 of outgoing ray from light guide fiber bundle: 0.45
Ray height ratio Δh: 1
Focal length f of whole illumination optical system: ∞
Refractive power ψ of roughened surface: 0
Pc/Ra: 15

EMBODIMENT 8

Figure 19A:
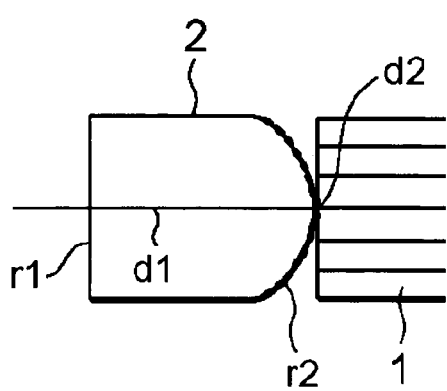
FIGS. 19A and 19B are diagrams showing Embodiment 8 of the illumination optical system according to the present invention.
Figure 19B:
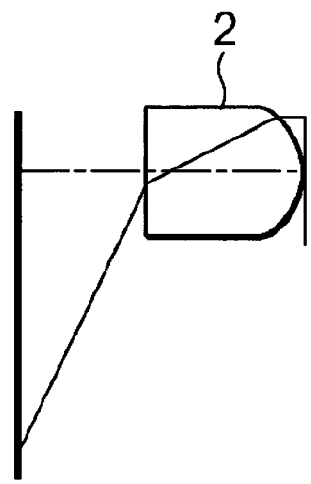

FIGS. 19A and 19B are diagrams showing Embodiment 8 of the illumination optical system. FIG. 19A is a sectional view along an optical axis, and FIG. 19B is an explanatory view showing that illumination light parallel to the optical axis is projected via the illumination optical system.

In the illumination optical system 2 of Embodiment 8, the basic structure of the illumination optical system, and the number and amplitude of corrugations, are similar to those of Embodiment 1. Additionally, in the illumination optical system 2 of Embodiment 8, roughness of a roughened surface disposed on a convex surface r2 of a plano-convex lens differs between a central area and a peripheral area. An arithmetic average roughness Ra of the central area of the convex surface r2 is about 0.3, and that of the peripheral area is about 0.6. It is desirable that the arithmetic average roughness Ra is set to be 0.05-0.5 in the central area and to be 0.1-0.75 in the peripheral area.

The peripheral portion of an illuminated area is primarily illuminated by light rays from a peripheral area of a light guide fiber bundle. Therefore, light distribution unevenness is related to the peripheral portion of the lens surface that passes the light rays from the peripheral area of the light guide fiber bundle. In the illumination optical system 2 of Embodiment 8, in order to largely diffuse the light ray from the peripheral area of the light guide fiber bundle 1, the arithmetic average roughness Ra of the peripheral portion of the convex surface r2 is increased. Moreover, to suppress the loss of a quantity of light in a central portion of the illuminated area and secure brightness, the arithmetic average roughness Ra of the central portion of the lens surface r2 is reduced.

Here, assuming that the radius of the light guide fiber bundle 1 is r, the central area of the light guide fiber bundle is defined as an area ranging from the center thereof up to the position about r/2 to 3r/4 from the center of the light guide fiber bundle 1, and the peripheral area is defined as the outside of the central area. The central portion of the roughened surface (lens surface r2) is defined as an area of the lens surface r2 that passes the light rays emitted from the central area of the light guide fiber bundle in parallel with the optical axis of the illumination optical system, and a portion other than the central portion is defined as the peripheral portion of the roughened surface. In the illumination optical system 2 of Embodiment 8, an outer diameter of the plano-convex lens is φ1.5, the central portion of the lens is set to an area of about φ0.8, and the area other than this area is assumed as the peripheral portion.

In the illumination optical system 2 of Embodiment 8, the roughened surface r2 of the lens faces an emission end surface side of the light guide fiber bundle 1. Therefore, when tracing the ray extending from an emission end of the light guide fiber bundle 1 in parallel with the optical axis of the light guide fiber bundle, the height of ray on the emission end of the light guide fiber bundle 1 is the same as that on the lens surface r2. Therefore, the central area of the light guide fiber bundle and the central portion of the roughened lens surface fully overlap when viewed in the direction along the optical axis.

The roughness on the roughened surface preferably continuously changes from the central portion to the peripheral portion, but it is difficult to work each portion distinctively in the working process of the roughened surface. However, the ray is diffused by the roughened surface. Therefore, even when the arithmetic average roughness Ra changes discontinuously from the central portion to the peripheral portion, light distribution characteristics are not largely influenced. To change the roughness of the roughened surface, a working condition such as the number of revolutions of an abrasive wheel may be changed for each portion.

According to the illumination optical system 2 of Embodiment 8, the quantity of light of the central portion increases and bright illumination can be obtained, since the arithmetic average roughness Ra of the lens surface in the central area is set to be smaller than that in the peripheral portion.

Next, numerical data of the illumination optical system of Embodiment 8 will be described. The data common to that of the illumination optical system of Embodiment 1 is omitted.

Numerical Data 8

Arithmetic average roughness Ra of roughened surface in range of central portion with φ0.8: 0.3 [μm]
Arithmetic average roughness Ra of roughened surface in a range of φ0.8 to φ1.5 of peripheral portion: 0.6 [μm]
Corrugations of surface shape in roughened surface: 5 times
PV value of amplitude of corrugation: 15 [μm]
Lens outer diameter: φ1.5
Outer diameter of light guide fiber bundle: φ1.35
NA: 0.6
Interval Pc between cores of light guide fiber bundle: 3 μm
Filling factor of light guide fiber bundle: 75.2%
Sectional area S0 of light guide fiber bundle: 1.431 mm$^2$
Sectional area S1 of core portion of light guide fiber bundle: 0.873 mm$^2$
Ratio of sectional area ΔS: S1/S0=0.61
Distance t from emission surface of lens to illuminated surface: 1.5 mm
Ray height h1 on illuminated surface: 3.394
Maximum ray height h0 of outgoing ray from light guide fiber bundle: 0.675
Ray height ratio Δh: 5.03
Focal length f of whole illumination optical system: 0.764
Refractive power ψ of roughened surface: 1.308
Assuming that Ra is 0.3 μm,
Pc/Ra: 10;
|1/f|×Pc/Ra: 13.09 [1/mm]; and
|1/f|×Pc/Ra×(1/NA): 21.82 [1/mm].
Assuming that Ra is 0.6 μm,
Pc/Ra: 5;
|1/f|×Pc/Ra: 6.54 [1/mm]; and
|1/f|×Pc/Ra×(1/NA): 10.91 [1/mm].

EMBODIMENT 9

Figure 20:
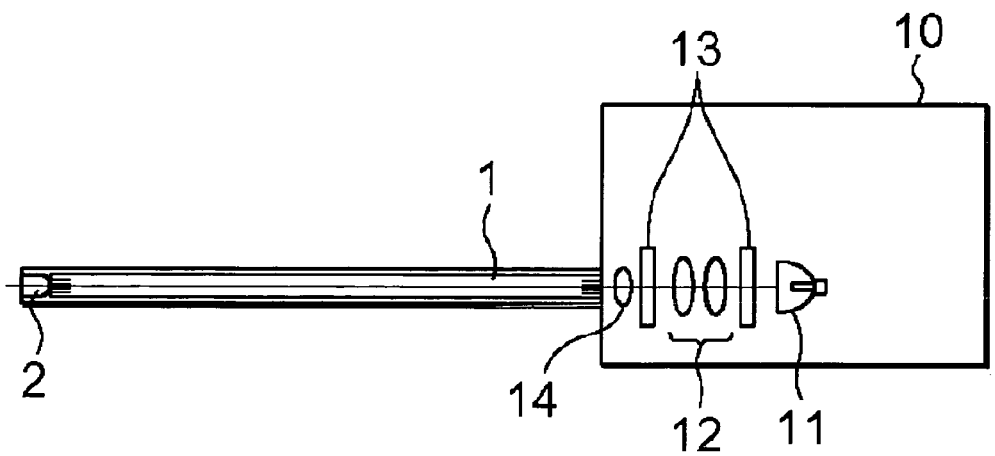
FIG. 20 is a schematic diagram of Embodiment 9 which is an illumination apparatus using the illumination optical system according to the present invention.

FIG. 20 is a diagram showing Embodiment 9 which is an illumination apparatus using the illumination optical system of the present invention.

The illumination apparatus of Embodiment 9 comprises: a light source unit 10; a light guide fiber bundle 1; and an illumination optical system 2 provided with any of the above-described embodiments according to the present invention. The light source unit 10 includes a light source lamp 11, a condenser lens 12, a collector lens 14, and optical filter arrays 13. Outgoing light from the light source lamp 11 is condensed on an incidence end surface of the light guide fiber bundle 1 via the condenser lens 12 and the collector lens 14. The optical filter arrays 13 include an infrared light cutting filter or an ultraviolet light cutting filter for cutting the infrared light or the ultraviolet light which is unnecessary during observation by visible light. The filter arrays are disposed between the light source lamp 11 and the condenser lens 12, and between the condenser lens 12 and the collector lens 14.

The light that entered the light guide fiber bundle 1 via an incidence end travels through fibers in the light guide fiber bundle 1 and exits from an emission end. The illumination optical system 2 is disposed on an emission end side of the light guide fiber bundle 1 to illuminate an object with illumination light from the light guide fiber bundle 1. Any of the illumination optical systems of Embodiments 1 to 8 can be used as the illumination optical system 2 in Embodiment 9. Therefore, the illumination light does not incur any color unevenness through a lens function or light distribution unevenness because of the dot-matrix structure of the light guide fiber bundle 1, and satisfactory observation can be performed.

As the light source lamp 11, a lamp such as a halogen lamp, a xenon lamp, or a mercury lamp, a light emitting device such as an LED or the like is usable. The optical filter array 13 is detachably inserted in an illumination light path in such a manner that the filter can be appropriately replaced with a filter having a different characteristic in accordance with a wavelength range for use. For example, when infrared light is to be used, the infrared light cutting filter may be removed. When ultraviolet light is to be used, the ultraviolet light cutting filter may be removed. To selectively use a specific wavelength band, the filter may be changed to a band pass is filter that only passes the specific wavelength band.

Furthermore, the light guide fiber bundle 1 may be assembled integrally with the light source unit 10, or designed to be detachable from the light source unit 10 together with the illumination optical system 2. When the light guide fiber bundle is designed to be detachable, there is an advantage that one light guide fiber bundle 1 is usable for a plurality of light sources. Moreover, the illumination optical system 2 may be formed integrally with the light guide fiber bundle 1 or separately from the bundle. When the system is formed separately, for example, illumination optical systems having different light distribution characteristics may be selectively used in accordance with applications.

EMBODIMENT 10

Figure 21:
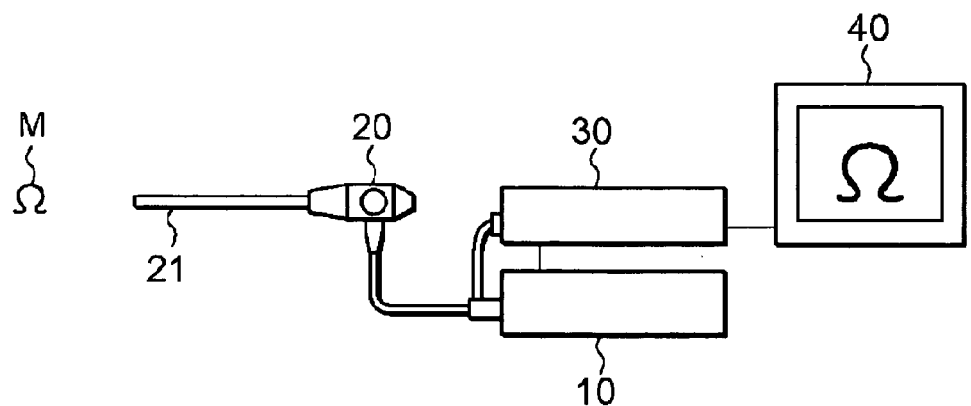
FIG. 21 is a schematic diagram of Embodiment 10 which is an observation system using an endoscope provided with the illumination optical system according to the present invention.
Figure 22:
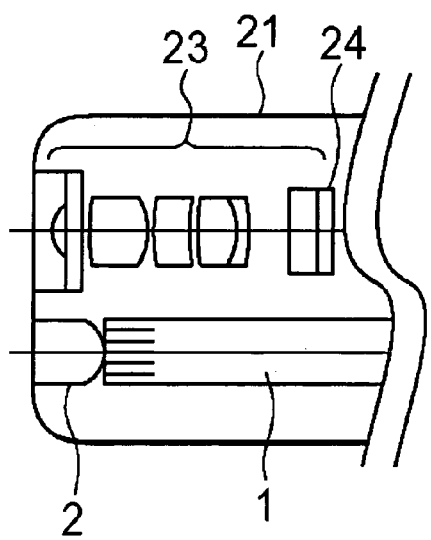
FIG. 22 is a partially enlarged sectional view showing a distal end portion of an insertion section 21 of the endoscope for use in the observation system of FIG. 21.

FIG. 21 is a schematic diagram showing Embodiment 10 which is an observation system using an endoscope provided with an illumination optical system of the present invention. FIG. 22 is a partially enlarged sectional view showing a constitution of a tip portion of an insertion part 21 of the endoscope in the observation system of FIG. 21.

The observation system of Embodiment 10 comprises a light source unit 10, an endoscope 20, an image processor 30, and a monitor 40. The endoscope 20 comprises a light guide fiber bundle disposed therein. The endoscope 20 is connected to the light source unit 10 and the image processor 30.

In the light source unit 10, although not shown, there are disposed a light source lamp, a condenser lens, an optical filter array and the like as described in Embodiment 9. Moreover, outgoing light from the light source lamp is condensed on an incidence end surface of the light guide fiber bundle disposed in the endoscope 20. As shown in FIG. 22, the light guide fiber bundle 1 extends to a tip portion of the insertion section 21 of the endoscope 20, and transmits the light from the light source unit 10 to the tip portion of the insertion section 21.

The tip portion of the insertion section 21 comprises an illumination optical system 2 disposed on an emission end side of the light guide fiber bundle 1, an objective optical system 23 disposed in a light path different from that of the illumination optical system, and an image pickup device 24. The illumination optical system 2 comprises a plano-convex lens similar to that of Embodiment 1. The illumination optical system is constituted in such a manner as to diffuse the outgoing light from the light guide fiber bundle 1 to illuminate the object M. As mentioned above, any of Embodiments 2 to 8 may also be used as the illumination optical system 2. The objective optical system 23 forms an image of the object M on the image pickup device 24. The image pickup device 24 is formed using a solid image pickup device such as a CCD (Charge Coupled Device). The device receives the image formed by the objective optical system, converts the image into an electric signal and output the signal. The image processor 30 processes the signal of the image supplied from the image pickup device 24. The monitor 40 is implemented using a CRT, a liquid crystal display device or the like, and displays image information based on the image signal supplied from the image processor 30.

The illumination optical system 2 has a construction, functions, and effects similar to those of any of the illumination optical systems of Embodiments 1 to 8. Therefore, illumination light does not incur color unevenness through a lens function or light distribution unevenness because of a dot-matrix structure of the light guide, and satisfactory observation can be performed. Light distribution on the object surface can be uniform and broad, and a loss of the quantity of light can be reduced. The illumination optical system of this type is particularly suitable for the application to a medical endoscope observation system in which reduction of the diameter of the insertion section and enhancement of operability are highly demanded.

It is to be noted that the endoscope 20 may be an endoscope of the type referred to as a simultaneous color system or a field sequential color system. The systems are different from each other in their method of processing a color image signal. In the simultaneous color system, a complementary color mosaic filter or a prime color mosaic filter is disposed before the image pickup device 24 located in the tip portion of the insertion section 21 of the endoscope 20. The signal is colored based on the intensity of light that passes through each color filter. In the field sequential color system, no color filter is disposed before the image pickup device 24. Therefore, the light source unit 10 successively illuminates the object with light of three primary colors RGB. The images captured by the image pickup device are synthesized and natural color images are produced.

Figure 23:
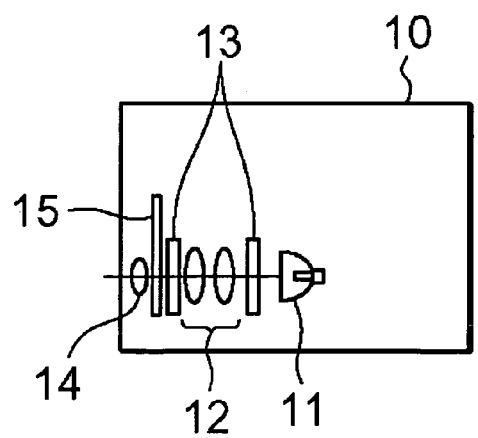
FIG. 23 is a schematic diagram showing one example of a light source device in which an RGB field sequential illumination system is adopted.

FIG. 23 is a schematic diagram showing one example of a light source section in which an RGB system is employed. In the example of FIG. 23, the light source unit 10 includes an RGB rotary filter 15 for separating the light from a light source lamp 11 into three primary colors RGB. The RGB rotary filter 15 includes filters, each of which transmit one of the wavelengths of RGB. These filters are arranged in the circumferential direction on a rotary disc. When the rotary disc is rotated, the filters for RGB are selectively inserted into the illumination optical path. When an infrared light or an ultraviolet light is used, optical filters having desired spectral characteristics may be used in place of optical filters 13. These filters may be disposed in the light source unit 10. Further, specific filters having characteristics suitable for a specific purpose or usage, such as a band pass filter which transmits only a specific wavelength of a visible band, may be used with or without an infrared light cutting filter and/or an ultraviolet light cutting filter.

Moreover, in the observation system of Embodiment 10, the light source unit 10, the image processor 30, and the monitor 40 are separately formed, but they may be partially or entirely structured integrally. The endoscope 20 is not limited to an endoscope in which the image pickup device 24 is disposed in the tip portion of the insertion section 21. An image guide fiber bundle may be disposed in the tip portion of the insertion section 21, and the image pickup device 24 may be disposed in a main body section of the endoscope 20. In addition to the above-described CCD, a CMOS image sensor or other types of solid image pickup devices may be used as the image pickup device 24.

EMBODIMENT 11

Figure 24:
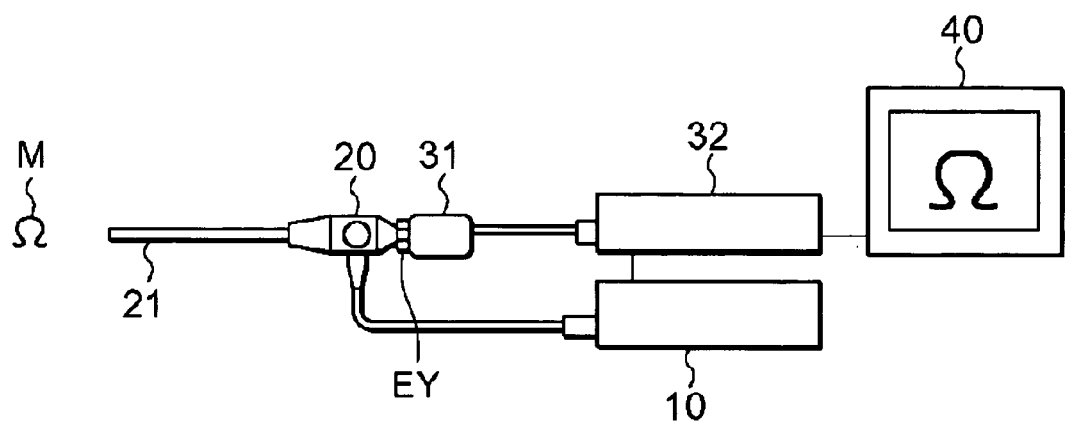
FIG. 24 is a schematic diagram of Embodiment 11 which is an observation system using the endoscope provided with the illumination optical system according to the present invention.

FIG. 24 is a schematic diagram showing Embodiment 11, which is an observation system using an endoscope provided with an illumination optical system.

In the observation system of Embodiment 11, a fiberscope or a rigid endoscope may be used as an endoscope 20. A television camera 31 containing an image pickup device is attached to an eyepiece section EY of the endoscope 20 to form the observation system having a function similar to that of Embodiment 10. In the case where the endoscope 20 is a fiberscope, the endoscope comprises, in addition to a light guide fiber bundle, an image guide bundle that guides light passed through an objective optical system disposed in the tip portion of the insertion section 21; and an eyepiece optical system (not shown). In the case where the endoscope is a rigid endoscope, the endoscope comprises, in addition to the light guide fiber bundle, a relay lens system and an eyepiece optical system. Unlike the Embodiment 10, the image pickup device is disposed in the television camera 31, not in the tip portion of the insertion section 21. Although not shown, the television camera 31 has an imaging optical system, which forms an image of an object on an image pickup surface, and an image pickup device. The light source unit 10, the light guide fiber bundle 1 and the illumination optical system 2 in the endoscope 20 are constructed in a manner similar to those of Embodiment 10.

In the observation system of Embodiment 11, an image of the object M obtained through the eyepiece optical system of the endoscope 20 is projected onto the image pickup device (not shown) via the imaging optical system disposed in the television camera 31. An electric signal obtained from the image pickup device is processed in a camera control unit 32, and an object image is displayed on a monitor 40. It is to be noted that the basic image processing steps from the image pickup device to the monitor 40 are similar to those of Embodiment 10. In the observation system of Embodiment 11, since the illumination optical system of the present invention is used, bright and satisfactory image observation is possible without any illumination unevenness.

EMBODIMENT 12

Figure 25:
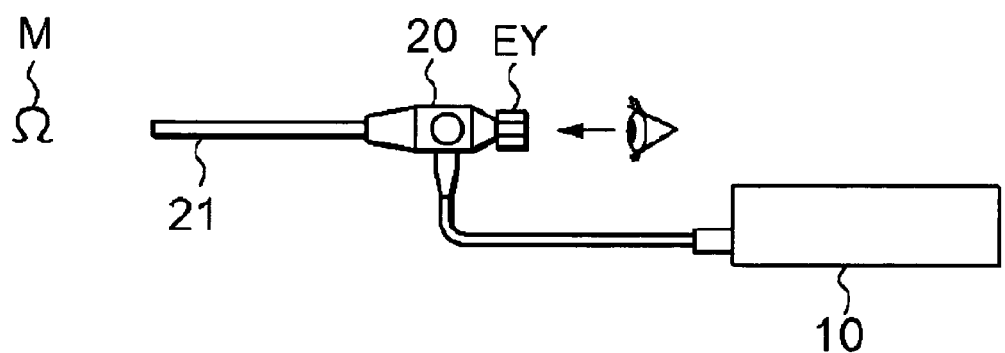
FIG. 25 is a schematic diagram of Embodiment 12 which is an observation system using the endoscope provided with the illumination optical system according to the present invention.

FIG. 25 is a schematic diagram showing Embodiment 12, which is an observation system using an endoscope provided with an illumination optical system. In the observation system of Embodiment 12, a fiberscope or a rigid endoscope may be used as the endoscope 20. The fiberscope or the rigid endoscope is combined with a light source, so that an image of the object M obtained by the endoscope 20 can be directly visually observed. The constructions of a light source unit 10 and the endoscope 20 are basically similar to those of Embodiment 11.

According to the observation system of Embodiment 12, since the illumination optical system of the present invention is used, bright and satisfactory visual observation is possible without any illumination unevenness.

In the above-described embodiment, a light guide fiber bundle, disposed on an incidence side of the illumination optical system, functions as a means for supplying light to the illumination optical system. More specifically, the light guide fiber bundle serves as a means for guiding illumination light emitted from a light source, or a part of the light source. However, a light emitting device such as a light emitting diode (LED) may be used as the means for supplying the light to the illumination optical system, instead of the light guide fiber bundle.

EMBODIMENT 13

Figure 26A:
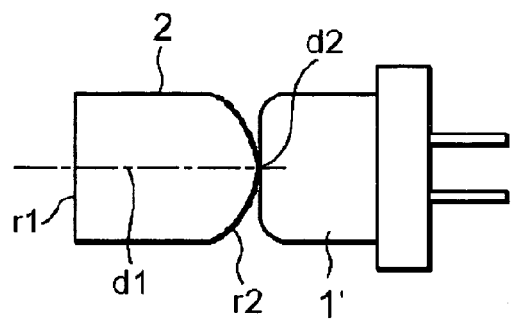
FIGS. 26A and 26B are diagrams showing Embodiment 13 of an illumination optical system according to the present invention.
Figure 26B:
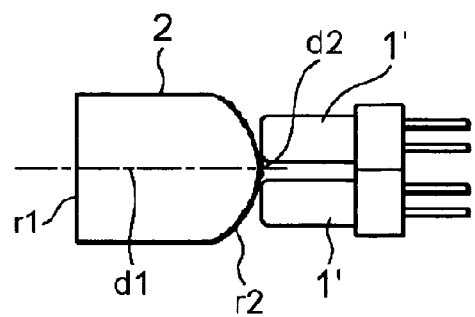

FIGS. 26A and 26B are diagrams showing Embodiment 13 which is an illumination apparatus using an illumination optical system 2 of the present invention and an LED. FIG. 26A shows an example in which one LED device is used as the light source, and FIG. 26B shows an example in which two LED devices are used.

In Embodiment 13, the illumination optical system 2 is the same as that of Embodiment 1, and is disposed in the vicinity of an LED device 1'. It is to be noted that an embodiment of an illumination optical system other than Embodiment 1 may be used. The number of the LED device 1' used is not limited to only one as shown in FIG. 26A. For example, as shown in FIG. 26B, a plurality of LED devices may be used. Especially, when a plurality of LED devices 1' are used, a dark portion is generated between light emitting parts of the LEDs, and light distribution unevenness is sometimes generated on an illuminated surface. The illumination optical system of the present invention including a roughened surface functions effectively in order to reduce the illumination unevenness.

In the above-described embodiments, cases where the illumination optical system is applied mainly to an endoscope have been described, but the above-described illumination optical system is also applicable to an optical apparatus other than an endoscope. Moreover, in Embodiments 10 to 12, the endoscope includes both the observation optical system and the illumination optical system. However, the observation optical system may be separated from the illumination optical system. Furthermore, in these embodiments, the total length of the illumination optical system, which includes a small number of optical elements, can be shortened. Therefore, the system makes a significant contribution to the reduction of the length of the tip portion in a case where the system is used in an endoscope.

During the assembling process of the illumination optical system, or after the illumination optical system has been assembled, dust sometimes enters between the optical elements. The shade of the dust is projected onto the illuminated surface and causes illumination unevenness. When the illumination optical system is miniaturized, the shade of the dust becomes conspicuous. However, according to the above-described illumination optical system, the lens surface is roughened, and therefore the shade of the dust is inconspicuous due to the diffusing effects of the light on the roughened surface.

Moreover, in each of the embodiments, a glass material having a high refractive index nd of 1.883 is used for the optical element having the roughened surface in the illumination optical system. However, a glass material having a low refractive index, such as BK7 or B270-Superwhite (SCHOTT DESAG AG Co.) (nd is about 1.52) or an optical crystal such as sapphire may be used. Furthermore, the plano-convex lens may be formed of a single fiber, and the roughened lens surface may be formed on the convex surface thereof.

In this application, the roughness of the roughened surface is indicated using the arithmetic average roughness Ra. However, a root-mean-square (rms) roughness Rq may be used. A numeric value of the arithmetic average roughness Ra is not equal to that of the rms roughness Rq. However, the value of the rms roughness Rq has a correlation with the quantity of light, light distribution unevenness, or optical characteristics such as light distribution characteristics. Therefore, in a case where the rms roughness Rq is used as an evaluation index instead of the arithmetic average roughness Ra, substantially the same optical performance as that when Ra is used as an evaluation is obtained.

While there has been shown and described what are considered to be exemplary embodiments of the present invention, it will, of course, be understood that various modifications and changes in form or detail could be readily be made without departing from the spirit of the invention. It is, therefore, intended that the invention be not limited to the exact forms described and illustrated, but should be constructed to cover all modifications that may fall within the scope of the appended claims.

What is claimed is:

1. An illumination optical system for diffusing illumination light emitted from a light source, comprising:
   an optical element having a roughened surface,
   wherein an arithmetic average roughness of the roughened surface is set in a range of 0.05 to 0.75 µm, and
   wherein the roughened surface has corrugations, the number of corrugations is 20 or less over the width of the roughened surface, and the corrugations have a PV value of 50 µm or less.

2. An illumination apparatus comprising the illumination optical system according to claim 1.

3. An observation system comprising:
   a light source;
   the illumination optical system according to claim 1; and
   an observation apparatus for visually observing an object illuminated by the illumination optical system or displaying an image of the object on an external display apparatus for observation of the object.

4. An observation system comprising:
   a light source;
   the illumination apparatus according to claim 2; and
   an observation apparatus that is adapted for at least one of visual observation of an object illuminated by the illumination optical system and displaying of an image of the object on an external display apparatus for observation of the object.

5. An illumination optical system comprising:
   a light guide fiber bundle for guiding illumination light emitted from a light source; and
   an optical element disposed on an emission side of the light guide fiber bundle and having a roughened surface,
   wherein an arithmetic average roughness of the roughened surface is set in a range of 0.05 to 0.75 µm, and
   wherein the roughened surface has corrugations, the number of corrugations is 20 or less over the width of the surface, and the corrugations have a PV value of 50 µm or less.

6. An illumination optical system comprising:
   a light guide fiber bundle for guiding illumination light emitted from a light source; and
   a positive lens disposed on an emission side of the light guide fiber bundle and having a roughened surface,
   wherein an arithmetic average roughness of the roughened surface is set in a range of 0.2 to 0.75 µm, and
   wherein the roughened surface of the positive leng has corrugations, the number of corrugations is 20 or less over the width of the surface, and the corrugations have a PV value of 50 µm or less.

7. The illumination optical system according to claim 6, wherein a maximum emission angle of the illumination optical system is at least 85°, and wherein light distribution of the illumination optical system in a direction in which an emission angle from the illumination optical system is 85° is 0.03 or more in terms of intensity on an object surface having a spherical shape, when assuming that an intensity at a center of the object surface to be illuminated is 1.

8. The illumination optical system according to claim 5, wherein assuming that a sectional area of the light guide fiber bundle is S0, a total sectional area of core portions of fibers constituting the light guide fiber bundle is S1, and a ratio ΔS of the total sectional area of the core portions to the sectional area of the light guide fiber bundle is ΔS=S1/S0, the following condition is satisfied:

$$\Delta S \geq 0.5.$$

9. The illumination optical system according to claim 8, wherein the following condition is satisfied:

$$\Delta S \geq 0.6.$$

10. The illumination optical system according to claim 1, comprising:
    a plane parallel plate positioned to be closest to an object in the illumination optical system,
    wherein the roughened surface is disposed on at least one of a surface of the plane parallel plate on a light source side, and a surface of an optical element, except the plane parallel plate, positioned to be closest to the object.

11. The illumination optical system according to claim 1, wherein the optical element is a negative lens which has the roughened surface on at least one of two lens surfaces thereof.

12. The illumination optical system according to claim 1, wherein the optical element has no optical power, and wherein the optical element has a roughened surface on at least one of two surfaces of the optical element.

13. The illumination optical system according to claim 5, wherein the roughness of the roughened surface differs in a central portion and a peripheral portion of the optical element,
    wherein a central area of the light guide fiber bundle is defined as an area ranging from the center thereof up to a position abut r/2 to 3r/4 from the center of the light guide fiber bundle, wherein r is a radius of the light guide fiber bundle,
    wherein a peripheral area of the light guide fiber bundle is defined as an area outside of the central area,
    wherein the central portion of the roughened surface is defined as an area of the surface of the optical element that passes the light rays emitted from the central area of the light guide fiber bundle in parallel with the optical axis of the illumination optical system, and wherein the peripheral portion of the roughened surface is defined as a portion other than the central portion.

14. The illumination optical system according to claim 13, wherein the arithmetic average roughness of the roughened surface is fine in the central portion of the roughened surface, and coarse in the peripheral portion.

15. The illumination optical system according to claim 13, wherein the arithmetic average roughness of the central portion of the roughened surface has a value in a range of 0.05 to 0.5 μm, and the arithmetic average roughness of the peripheral portion has a value in a range of 0.1 to 0.75 μm.

16. The illumination optical system according to claim 1, wherein an outer shape of the optical element having the roughened surface is a shape that is different from a circular shape.

17. The illumination optical system according to claim 1, further comprising:
a light source having two dimensions,
wherein the following condition is satisfied;

$$\Delta h \geq 2$$

wherein Δh is a ray height ratio which is defined as Δh=h1/h0, and wherein h0 is a height of a ray emitted from a position of the light source having a maximum diameter in parallel with an optical axis of the illumination optical system, and wherein h1 is a height of the ray on a surface to be illuminated, and wherein a distance from an emission end of the illumination optical system to an illuminated surface is 1.5 mm.

18. The illumination optical system according to claim 5, wherein the following condition is satisfied:

$$1\times10^{-3} < Pc/Ra < 1\times10^{3},$$

where Pc denotes an interval between cores of the light guide fiber bundle, and Ra denotes a roughness of the roughened surface of the illumination optical system.

19. The illumination optical system according to claim 1, further comprising:
a plurality of light sources each having one light emitting part,
the illumination optical system satisfying the following condition:

$$1\times10^{-3} < Pc/Ra < 1\times10^{3},$$

where Pc denotes an interval between the light emitting parts of the plurality of light sources, and Ra denotes a roughness of the roughened surface of the illumination optical system.

20. The illumination optical system according to claim 5, wherein the following condition is satisfied:

$$1\times10^{-4}[1/mm] < |1/f|\times Pc/Ra < 1\times10^{4}[1/mm],$$

where Pc denotes an interval between cores of the light guide fiber bundle, Ra denotes a roughness of the roughened surface of the illumination optical system, and f denotes a focal length of the illumination optical system.

21. The illumination optical system according to claim 1, further comprising:
a plurality of light sources each having one light emitting part,
the illumination optical system satisfying the following condition:

$$1\times10^{-4}[1/mm] |1/f|\times Pc/Ra < 1\times10^{4}[1/mm],$$

where Pc denotes an internal between the light emitting parts of the plurality of light sources, Ra denotes a roughness of the roughened surface of the illumination optical system and f denotes a focal length of a virtual lens constituted by approximating a shape in the vicinity of an optical axis of the optical element having the roughened surface with a spherical surface.

22. The illumination optical system according to claim 5, wherein the following condition is satisfied:

$$1\times10^{-4}[1/mm] < |1/f|\times Pc/Ra \times (1/NA) < 1\times10^{5}[1/mm],$$

where Pc denotes an interval between cores of the light guide fiber bundle, Ra denotes a roughness of the roughened surface of the illumination optical system, f denotes a focal length of the illumination optical system, and NA denotes a numerical aperture of a light guide fiber.

23. The illumination optical system according to claim 1, further comprising:
a plurality of light sources each having one light emitting part,
the illumination optical system satisfying the following condition:

$$1\times10^{-4}[1/mm] < |1/f|\times Pc/Ra \times (1/NA) < 1\times10^{5}[1/mm],$$

where Pc denotes an interval between the light emitting parts of the plurality of light sources, Ra denotes a roughness of the roughened surface of the illumination optical system, f denotes a focal length of a virtual lens constituted by approximating a shape in the vicinity of an optical axis of the optical element having the roughened surface with a spherical surface, and NA denotes a sinusoidal value of half of a spread angle of outgoing light from the light emitting part of the light source.

* * * * *